United States Patent
Shimada et al.

(10) Patent No.: US 9,190,194 B2
(45) Date of Patent: Nov. 17, 2015

(54) SEMICONDUCTOR CERAMIC COMPOSITION, METHOD FOR PRODUCING THE SAME, AND PTC ELEMENT

(71) Applicant: HITACHI METALS, LTD., Minato-ku, Tokyo (JP)

(72) Inventors: Takeshi Shimada, Osaka (JP); Itaru Ueda, Osaka (JP); Kentaro Ino, Osaka (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 14/395,568

(22) PCT Filed: Apr. 19, 2013

(86) PCT No.: PCT/JP2013/061687
§ 371 (c)(1),
(2) Date: Oct. 20, 2014

(87) PCT Pub. No.: WO2013/157649
PCT Pub. Date: Oct. 24, 2013

(65) Prior Publication Data
US 2015/0109094 A1   Apr. 23, 2015

(30) Foreign Application Priority Data

Apr. 20, 2012 (JP) .................................. 2012-096546
May 24, 2012 (JP) .................................. 2012-118120
Dec. 21, 2012 (JP) .................................. 2012-279711

(51) Int. Cl.
   *H01C 7/00*   (2006.01)
   *C04B 35/468*   (2006.01)
   (Continued)

(52) U.S. Cl.
   CPC .............. *H01C 7/008* (2013.01); *C04B 35/468* (2013.01); *C04B 35/475* (2013.01);
   (Continued)

(58) Field of Classification Search
   CPC .. C04B 35/468; C04B 35/475; C04B 35/496; H01C 7/025; H01C 7/023
   See application file for complete search history.

(56) References Cited

U.S. PATENT DOCUMENTS 8,067,325 B2   11/2011   Shimada et al.
8,284,013 B2   10/2012   Goto et al.
(Continued)

FOREIGN PATENT DOCUMENTS

CN   101160270 A   4/2008
CN   101213155 A   7/2008
(Continued)

OTHER PUBLICATIONS

International Search Report dated Jul. 2, 2013 issued in International Application No. PCT/JP2013/061687 (PCT/ISA/210).
(Continued)

*Primary Examiner* — Karl Group
(74) *Attorney, Agent, or Firm* — Sughrue Mion, PLLC

(57) ABSTRACT

Provided is a semiconductor ceramic composition that is a lead-free semiconductor ceramic composition in which a portion of Ba in a $BaTiO_3$-based oxide is substituted by Bi and A (in which A is at least one kind of Na, Li and K), the semiconductor ceramic composition having a region between a center portion and an outer shell portion within a crystal grain, in which when Bi concentration is measured in a radial direction within the crystal grain, the Bi concentration in the region is higher than both Bi concentration in the center portion and Bi concentration in the outer shell portion.

15 Claims, 17 Drawing Sheets

(51) Int. Cl.
*H01C 7/02* (2006.01)
*H01C 17/065* (2006.01)
*C04B 35/626* (2006.01)
*C04B 35/475* (2006.01)
*C04B 35/495* (2006.01)
*C04B 35/505* (2006.01)
*H01B 1/08* (2006.01)

(52) U.S. Cl.
CPC ............ *C04B 35/495* (2013.01); *C04B 35/505* (2013.01); *C04B 35/62675* (2013.01); *H01B 1/08* (2013.01); *H01C 7/025* (2013.01); *H01C 17/06533* (2013.01); *C04B 2235/02* (2013.01); *C04B 2235/3201* (2013.01); *C04B 2235/3203* (2013.01); *C04B 2235/3224* (2013.01); *C04B 2235/3251* (2013.01); *C04B 2235/3294* (2013.01); *C04B 2235/3298* (2013.01); *C04B 2235/5436* (2013.01); *C04B 2235/5445* (2013.01); *C04B 2235/65* (2013.01); *C04B 2235/661* (2013.01); *C04B 2235/75* (2013.01); *C04B 2235/80* (2013.01)

(56) References Cited

U.S. PATENT DOCUMENTS

| | | |
|---|---|---|
| 2008/0170977 A1 | 7/2008 | Shimada et al. |
| 2008/0286185 A1 | 11/2008 | Shimada et al. |
| 2009/0036293 A1 | 2/2009 | Shimada et al. |

FOREIGN PATENT DOCUMENTS

| | | |
|---|---|---|
| CN | 101389581 A | 3/2009 |
| JP | 56-169301 A | 12/1981 |
| WO | 2006106910 A1 | 10/2006 |
| WO | 2006118274 A1 | 11/2006 |
| WO | 2007097462 A1 | 8/2007 |
| WO | 2010067866 A1 | 6/2010 |

OTHER PUBLICATIONS

Written Opinion dated Jul. 2, 2013 issued in International Application No. PCT/JP2013/061687 (PCT/ISA/237).

Office Action dated Jun. 30, 2015, issued by the State Intellectual Property Office of the People's Republic of China in counterpart Chinese Application No. 201380020900.6.

1 μm

US 9,190,194 B2

SEMICONDUCTOR CERAMIC COMPOSITION, METHOD FOR PRODUCING THE SAME, AND PTC ELEMENT

TECHNICAL FIELD

The present invention relates to a semiconductor ceramic composition which is used for a PTC heater, a PTC thermistor, a PTC switch, a temperature detector and the like, a method for producing the same, and a PTC element.

BACKGROUND ART

Conventionally, semiconductor ceramic compositions prepared by adding various semiconducting elements to a $BaTiO_3$-based oxide have been proposed as a material showing PTC (Positive Temperature Coefficient of resistivity) characteristic. The semiconductor ceramic composition can be used as a PTC element by providing electrodes thereon.

Most of semiconductor ceramic compositions composed of a $BaTiO_3$-based oxide have a Curie temperature of around 120° C. In these semiconductor compositions, the Curie temperature needs to be shifted according to use. For example, it has been proposed to shift the Curie temperature by adding an $SrTiO_3$-based oxide to a $BaTiO_3$-based oxide, but in this case, the Curie temperature is shifted only in a negative direction and is not shifted in a positive direction. Out of materials used in practice at present, the material known as an additive capable of shifting the Curie temperature in a positive direction is $PbTiO_3$. However, since lead is an element causing environmental pollution, a lead-free semiconductor ceramic material containing no lead is demanded.

As the production method for a lead-free semiconductor ceramic composition, there has been proposed a method for producing a $BaTiO_3$-based semiconductor ceramic composition, in which at least one of Nb, Ta and rare earth elements is added to a composition which is represented by a composition formula of $Ba_{1-2x}(BiNa)_xTiO_3$ in which a portion of Ba in a $BaTiO_3$-based oxide is substituted by Bi—Na, in which x satisfies 0<x≤0.15, followed by subjecting the composition to calcination in nitrogen and then sintering in an oxidative atmosphere (Patent Document 1).

According to the production method described in Patent Document 1, the temperature coefficient of resistance as one of PTC characteristics can be prevented from decreasing. Also, in Examples of Patent Document 1, all of raw materials Ba, Ti, Bi and Na in the composition formula above are mixed at a time and then calcined.

In addition, as the production method for a lead-free semiconductor ceramic composition, a semiconductor ceramic composition having a crystal grain which is represented by a composition formula of $[(BiNa)_x(Ba_{1-y}R_y)_{1-x}]TiO_3$, wherein a center portion and an outer shell portion of the crystal grain are different from each other in composition has been proposed (Patent Document 2). In Patent Document 2, the semiconductor ceramic composition containing the crystal grain above is said to have an effect of increasing the amount of Schottky barrier formation and enhancing the temperature coefficient α of resistance. Patent Document 2 discloses a method of separately preparing a (BaQ)$TiO_3$ calcined powder (in which Q is a semiconducting element) and a (BiNa)$TiO_3$ calcined powder, and then mixing the powders, followed by forming and sintering the mixture.

Patent Document 3 describes a lead-free semiconductor ceramic composition and discloses a compositional formulation where the main component is a $Ba_mTiO_3$-based composition having a perovskite structure represented by formula $A_mBO_3$ and a portion of Ba constituting the A site is substituted by at least an alkali metal element, Bi, and a rare earth element. In Examples of Patent Document 3, there is disclosed a semiconductor ceramic composition having a main phase represented by the composition formula of $(Ba_{0.898}Na_{0.05}Bi_{0.05}Y_{0.002})_mTiO_3+0.00025Mn$, in which a Y raw material is added.

BACKGROUND ART DOCUMENT

Patent Document

Patent Document 1: JP-A-S56-169301
Patent Document 2: WO2007/097462
Patent Document 3: WO2010/067866

SUMMARY OF THE INVENTION

Problems that the Invention is to Solve

Meanwhile, when the voltage applied between electrodes of a PTC element is raised little by little, the resistance value sharply increases due to self-heating by Joule heat, leading to decrease in the electric current, and when the voltage is further raised, thermal runaway may occur.

FIG. 1 is a view showing the relationship between the temperature and the resistivity of a semiconductor ceramic composition having PTC characteristics. In a semiconductor ceramic composition, when its own temperature rises to the Curie temperature $T_C$ or more, the resistivity sharply increases, but when the temperature exceeds a temperature $T_L$ showing peak value, the resistivity drops. This is because the PTC characteristics of the semiconductor ceramic composition are shifted to NTC (Negative Temperature Coefficient of resistivity) characteristics. Hereinafter, the temperature at which the characteristics are shifted is referred to as the heat-resistant temperature $T_L$. When a high voltage is applied at the heat-resistant temperature $T_L$ or more in the state of the resistivity being reduced, this increases the probability of flowing an abnormal current to cause thermal runaway. In order to prevent thermal runaway, a withstand voltage is indicated in an actual commercial product. The withstand voltage is, as shown in FIG. 2, a voltage value $V_0$ at the current minimum point when the relationship between the values of voltage and electric current applied to the PTC element is measured. If a voltage not less than the withstand voltage $V_0$ is applied to the PTC element, the electric current rapidly rises and in time, high resistance cannot be maintained, leading to occurrence of a voltage breakdown.

For example, since the PTC heater used in an electric car is required to reduce the energy loss, a structure enabling a high voltage supplied from a storage battery without the intervention of a transformer or the like to be applied directly to the PTC element is demanded.

In the lead-free semiconductor ceramic composition of Patent Document 1, the Curie temperature is about 150° C. and the heat-resistant temperature is only about 240° C. Also, although Patent Document 1 is silent on the withstand voltage, judging from the follow-up experiment carried out by the present inventors, the withstand voltage is thought to be not so high.

In the semiconductor ceramic composition described in Patent Document 2 in which a center portion and an outer shell portion of the crystal grain are different from each other in composition, it is understood that the heat-resistant temperature is high compared with a semiconductor ceramic composition having a crystal of single compositional formulation and thanks to this configuration, a high withstand voltage is obtained, but a higher withstand voltage is required, for example, in applications such as electric car.

Whether the PTC characteristics of a semiconductor ceramic composition are good or bad can be hardly judged only by the withstand voltage. The withstand voltage rises in proportion to the thickness of the semiconductor ceramic composition and in addition, the withstand voltage varies even when the resistance value of the semiconductor ceramic composition itself is high. Accordingly, when the performance of the semiconductor ceramic composition is evaluated by merely focusing only on the withstand voltage, a semiconductor ceramic composition having a high room-temperature resistivity is also rated as a semiconductor ceramic composition exhibiting a good performance. In addition to the withstand voltage, the thickness and room-temperature resistivity are also important characteristics to a semiconductor ceramic composition.

Therefore, in the present invention, in order to take into account the thickness of a semiconductor ceramic composition and the resistance value of the semiconductor ceramic composition itself, a withstand voltage per resistance (hereinafter, referred to as a normalized withstand voltage $V_L$) obtained by dividing the withstand voltage $V_0$ per 1 mm thickness by the room-temperature resistivity $R_0$ is calculated and employed as an indicator for evaluation. The measuring method is described later.

Accordingly, an object of the present invention is to provide a semiconductor ceramic composition having a high normalized withstand voltage, a PTC element using the composition, and a method for producing the semiconductor ceramic composition.

Means for Solving the Problems

The present invention is a semiconductor ceramic composition that is a lead-free semiconductor ceramic composition in which a portion of Ba in a BaTiO₃-based oxide is substituted by Bi and A (wherein A is at least one kind of Na, Li and K), the semiconductor ceramic composition having a region between a center portion and an outer shell portion within a crystal grain, wherein when Bi concentration is measured in a radial direction within the crystal grain, the Bi concentration in the region is higher than both Bi concentration in the center portion and Bi concentration in the outer shell portion.

Also, the present invention is a PTC element having electrodes on the semiconductor ceramic composition above.

Moreover, the present invention is a method for producing a semiconductor ceramic composition that is a lead-free semiconductor ceramic composition in which a portion of Ba in a BaTiO₃-based oxide is substituted by Bi and A (wherein A is at least one kind of Na, Li and K), the method comprising:
preparing, as a raw material, a (BiA)TiO₃-based first raw material and a (BaR)[TiM]O₃ (wherein R is at least one kind of rare earth elements including Y, M is at least one kind of Nb, Ta and Sb, and at least either one of R and M is an essential element)-based second raw material;
calcining the first raw material at 700° C. to 950° C. and the second raw material at 900° C. to 1,300° C.;
preparing a third raw material by mixing respective calcined raw materials;
heat-treating the third raw material at 900° C. to 1,250° C.; and
forming and sintering the third raw material so as to form a crystal grain having a region between a center portion and an outer shell portion within the crystal grain, wherein when Bi concentration is measured in a radial direction within the crystal grain, the Bi concentration in the region is higher than both Bi concentration in the center portion and Bi concentration in the outer shell portion.

Advantage of the Invention

According to the present invention, a semiconductor ceramic composition having a high normalized withstand voltage, a PTC element using the composition, and a method for producing the semiconductor ceramic composition, are provided.

MODE FOR CARRYING OUT THE INVENTION

Figure 1:
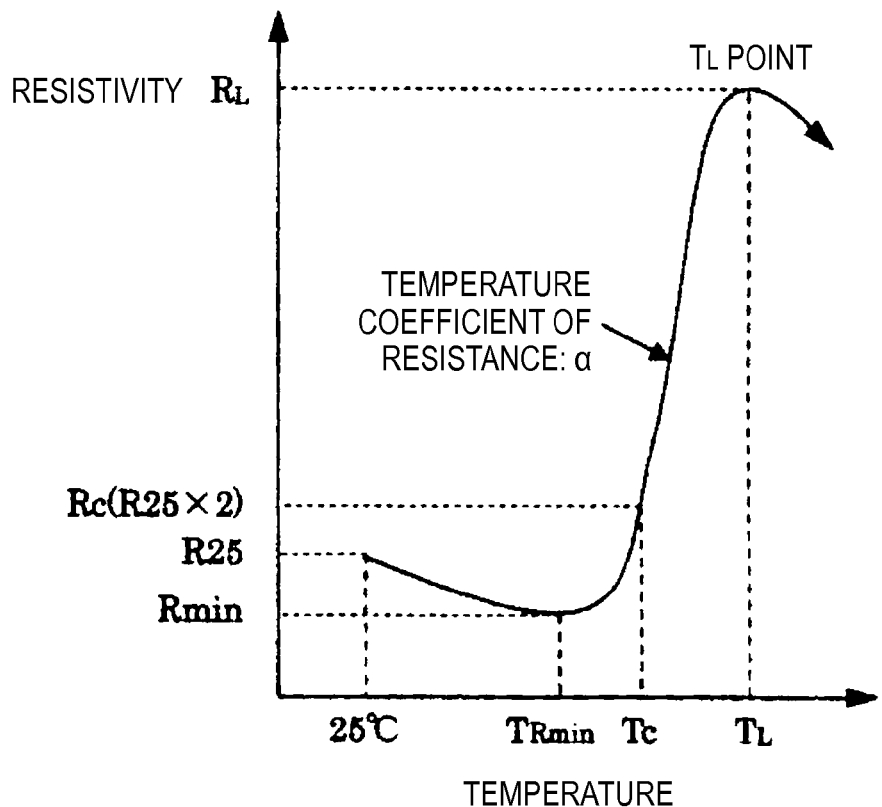
FIG. 1 is a view for explaining various characteristics of the semiconductor ceramic composition.

The semiconductor ceramic composition of the present invention has a region between a center portion and an outer shell portion within a crystal grain, in which when Bi concentration is measured in a radial direction within the crystal grain, the Bi concentration in the region is higher than both Bi concentration in the center portion and Bi concentration in the outer shell portion. Thanks to this configuration, the normalized withstand voltage of the semiconductor ceramic composition of the present invention is raised. Hereinafter, the region being located between the center portion and the outer shell portion within the crystal grain and having a highest Bi concentration within the crystal grain is referred to as a middle portion.

In the semiconductor ceramic composition of the present invention, an outer shell portion, a middle portion and a center portion differing in the Bi content are present within the crystal grain. It is presumed that the temperature coefficient α of resistance and the Curie temperature $T_C$ are different among respective sites, a plurality of kinds of sites differing in the PTC characteristics are present together inside a crystal grain of the semiconductor ceramic composition, and any one of these sites has a high normalized withstand voltage, as a result, a semiconductor ceramic composition having a high normalized withstand voltage as a whole is obtained.

Not all crystals in the semiconductor magnetic composition need to have the crystal structure specified in the present invention. In terms of the percentage per unit area in the structure observation photography, the crystal grain specified in the present invention preferably accounts for 10% or more, more preferably 50% or more, still more preferably 70% or more, based on the total number of crystal grains.

In the semiconductor ceramic composition, the maximum value of Bi concentration is preferably 0.4 mol % or more. As described above, it is presumed that by setting high the Bi concentration in the middle portion, grain boundaries having various Bi concentrations are formed by the crystal grain and the Curie temperature is shifted to the high temperature side, leading to a rise in the normalized withstand voltage. However, if the maximum value of Bi concentration is less than 0.4 mol %, the normalized withstand voltage cannot be raised sufficiently. The maximum value of Bi concentration is more preferably 0.5 mol % or more, where a numerical value of 0.8 mol % is still more preferred and a numerical value of 1.3 mol % is yet still more preferred. Also, the maximum value of Bi concentration is preferably 5.0 mol % or less, and a more preferable upper limit is 2.0 mol % or less.

Incidentally, the Bi concentration is a value obtained, for example, by calculating the mol of each element from the mass % of each element (Bi, A, Ba, R, Ti, M) except for oxygen in the crystal grain, calculating the mol of oxygen in the crystal grain from the obtained mol of each element according to the composition formula of $[(BiA)_x(Ba_{1-y}R_y)_{1-x}][Ti_{1-z}M_z]O_3$ of the crystal grain, and thereafter, calculating the mol % of Bi assuming that the sum total of the mols of all elements including oxygen is 100%.

The normalized withstand voltage $V_L$ of the semiconductor ceramic composition of the present invention can be 3.0 or more. The normalized withstand voltage is a value obtained by dividing the withstand voltage $V_0$ (V) per 1 mm thickness by the room-temperature resistivity $R_{25}$ (Ωcm).

The semiconductor ceramic composition of the present invention may have a crystal grain which is represented by a composition formula of $[(BiA)_x(Ba_{1-y}R_y)_{1-x}][Ti_{1-z}M_z]O_3$ (wherein A is at least one kind of Na, Li and K, R is at least one kind of rare earth elements including Y, and M is at least one kind of Nb, Ta and Sb) in which x, y and z satisfy $0<x\le0.2$, $0\le y\le0.02$ and $0\le z\le0.01$ (provided that y+z>0).

Also, in the semiconductor ceramic composition of the present invention, it is preferable that the semiconductor ceramic composition has a structure including: the crystal grain which is represented by a composition formula of $[(BiA)_x(Ba_{1-y}R_y)_{1-x}][Ti_{1-z}M_z]O_3$ (wherein A is at least one kind of Na, Li and K, R is at least one kind of rare earth elements including Y, and M is at least one kind of Nb, Ta and Sb) in which x, y and z satisfy $0<x\le0.2$, $0\le y\le0.02$ and $0\le z\le0.01$ (provided that y+z>0); a secondary phase containing Y; and a secondary phase not containing Y, in which in the secondary phase containing Y, Y amount in a portion distant from the crystal grain is larger than Y amount in a portion adjacent to the crystal grain. It is presumed that Y can hardly form a solid solution within the crystal grain and therefore, the diffusion of Bi oxide is appropriately suppressed, leading to reduction in the change over time.

In the composition formula above, the ratio between A site on the $[(BiA)_x(Ba_{1-y}R_y)_{1-x}]$ side and B site on the $[Ti_{1-z}M_z]$ side may be within the range of A site:B site=0.9 to 1.1:1. The ratio is preferably A site:B site=0.9 to 1.0:1, more preferably 0.990 to 1.000:1. An effect of reducing the change over time or an effect of enhancing the temperature coefficient α of resistance can be expected.

In the secondary phase containing Y, the Y amount in the portion distant from the crystal grain is preferably larger than the Y amount in the portion adjacent to the crystal grain. More specifically, the Y amount in the portion distant from the crystal grain is preferably 35 mol % or more in terms of oxide. On the other hand, the Y amount in the portion adjacent to the crystal grain is preferably from 5 mol % to less than 35 mol % in terms of oxide. Incidentally, the secondary phase not containing Y indicates a phase where the Y amount is 0.01% or less. As for the measurement of Y amount, a method of calculating the percentage of $YO_{3/2}$ assuming that the total of $NaO_{1/2}$, $BiO_{3/2}$, BaO, $LaO_{3/2}$, $TiO_2$ and $YO_{3/2}$ is 100 mol %, may be employed.

The crystal grain preferably has a higher Y concentration in the outer shell portion than in the center portion within the crystal grain. Specifically, the Y concentration in the outer shell portion is 1.2 times or more, further 1.5 times or more, greater than the Y concentration in the center portion. Incidentally, not all crystals in the semiconductor ceramic composition need to have this Y concentration gradient. In terms of the percentage per unit area in the structure observation photography, the crystal grain having the above-described Y concentration gradient preferably accounts for 10% or more, more preferably 50% or more, still more preferably 70% or more, based on the total number of crystal grains.

The PTC element of the present invention has the above-described semiconductor ceramic composition and an electrode provided on the semiconductor ceramic composition. Such a PTC element has excellent PTC characteristics and is less likely to cause a voltage breakdown.

Figure 3:
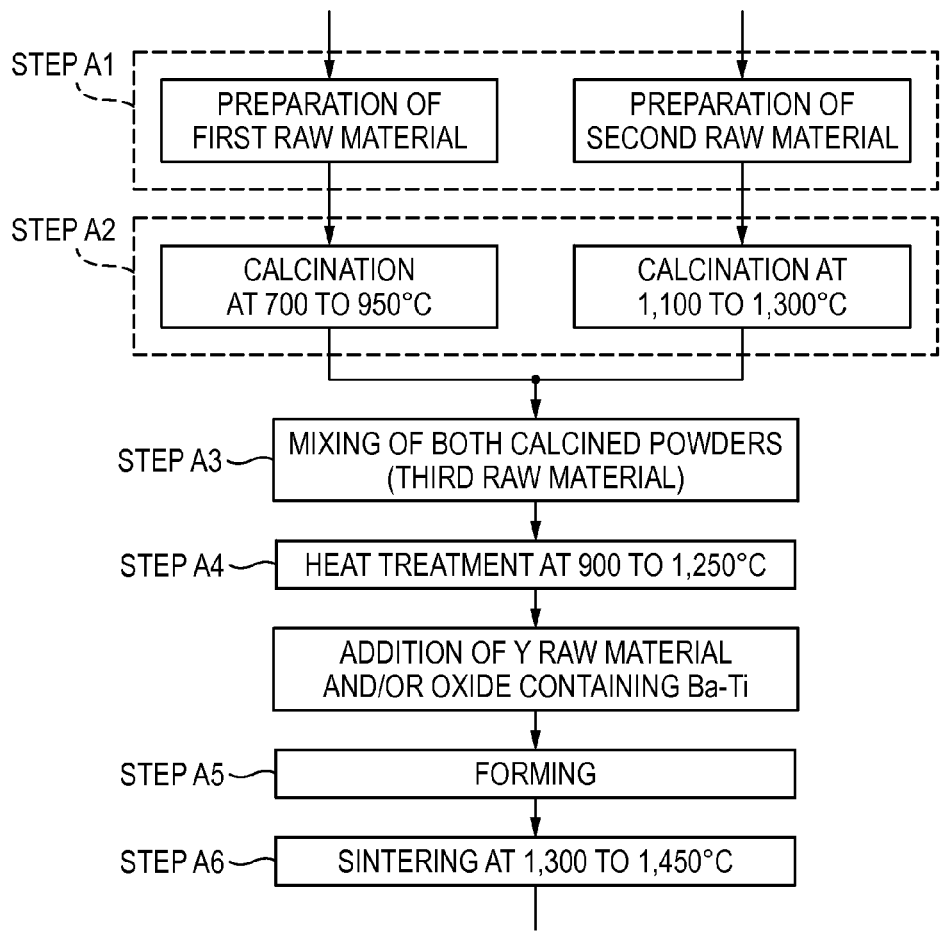
FIG. 3 is a view illustrating a preferable production method for obtaining the semiconductor ceramic composition of the present invention.

The semiconductor ceramic composition of the present invention is a lead-free semiconductor ceramic composition in which a portion of Ba in $BaTiO_3$-based oxide is substituted by Bi and A. A preferable production method for the semiconductor ceramic composition of the present invention includes, as shown in FIG. 3, (Step A1) preparing, as the raw material, a $(BiA)TiO_3$-based first raw material and a $(BaR)[TiM]O_3$ (R is at least one kind of rare earth elements including Y, and M is at least one kind of Nb, Ta and Sb)-based second raw material; (Step A2) calcining the first raw material at 700° C. to 950° C. and the second raw material at 900° C. to 1,300° C.; (Step A3) preparing a third raw material by mixing respective calcined raw materials; (Step A4) heat-treating the third raw material at 900° C. to 1,250° C.; and thereafter, (Step A5) forming and (Step A6) sintering the third raw material.

By performing (Step A4) a heat treatment at 900° C. to 1,250° C., a portion of Bi vaporizes, and a semiconductor ceramic composition having a Bi concentration distribution peculiar to the present invention and having a large normalized withstand voltage is obtained.

Figure 4:
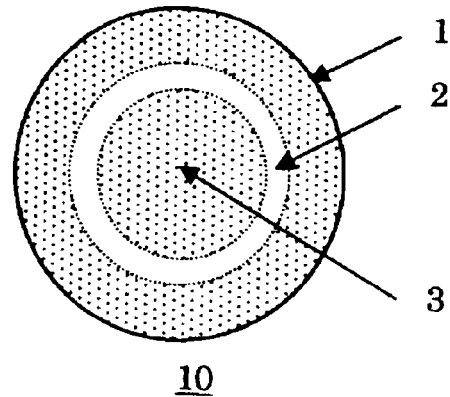
FIG. 4 is a schematic view of a crystal grain in the semiconductor ceramic composition of the present invention.

FIG. 4 is a schematic view of a crystal grain in the semiconductor ceramic composition of the present invention. The above-described production method, as shown in FIG. 4, provides a semiconductor ceramic composition having a region between the center portion 2 and the outer shell portion 1 within a crystal grain, in which when Bi concentration is measured in a radial direction within the crystal grain, the Bi concentration in the region is higher than both Bi concentration in the center portion 2 and Bi concentration in the outer shell portion 1 when the Bi concentration is measured in the radial direction within the crystal grain, and also provides a semiconductor ceramic composition having a high normalized withstand voltage. At this time, the Bi concentration in the middle portion 3 is 0.4 mol % or more. The Bi concentration in the center portion 3 and the outer shell portion 1 sometimes exceeds 0.4 mol % and in this case, the Bi concentration in the middle portion 3 becomes higher.

The middle portion may have a concentration higher by 2 times or more, further by 3 times or more, than the Bi concentration in the center portion. Also, the outer shell portion may have a concentration higher by 1.2 times or more, further by 1.5 times or more, than the Bi concentration in the center portion. The Bi concentration in the center portion is defined as a value obtained by measuring the Bi concentration at the position equal to the gravity center of a crystal grain.

In the production method of the semiconductor ceramic composition of the present invention, the first and second raw materials are preferably mixed such that the composition formula of the semiconductor ceramic composition is represented by a composition formula of $[(BiA)_x(Ba_{1-y}R_y)_{1-x}][Ti_{1-z}M_z]O_3$ (wherein A is at least one kind of Na, Li and K, R is at least one kind of rare earth elements including Y, and M is at least one kind of Nb, Ta and Sb) in which x, y and z satisfy $0<x\leq0.2$, $0\leq y\leq0.05$ and $0\leq z\leq0.01$ (provided that $y+z>0$).

A preferable production method for obtaining the semiconductor ceramic composition of the present invention is described in detail by referring to FIG. 3. FIG. 3 is a view illustrating the steps in the production method of the present invention.

A $(BiA)TiO_3$-based first raw material and a $(BaR)[TiM]O_3$-based second raw material are prepared (Step A1), and the first raw material and the second raw material are calcined at different temperatures (Step A2). According to the production process, vaporization of Bi can be inhibited to prevent the compositional deviation of Bi-A and suppress the production of a heterophase containing A, and the room-temperature resistivity can be reduced to suppress the variation in the Curie temperature. Each of (Step A1) and (Step A2) is described in detail below.

(Step A1) is described in detail. The $(BiA)TiO_3$-based first raw material is produced by mixing $A_2CO_3$, $Bi_2O_3$ and $TiO_2$ as raw material powders. Here, the $(BiA)TiO_3$-based first raw material indicates a raw material for forming a $(BiA)TiO_3$ oxide.

The $(BaR)[TiM]O_3$-based second raw material is produced by mixing $BaCO_3$, $TiO_2$ and raw material powders of R and M, for example, an R element oxide such as $La_2O_3$ and an M element oxide such as $Nb_2O_5$. R and M are used as a semiconducting element. Here, the $(BaR)[TiM]O_3$-based second raw material indicates a raw material for forming a $(BaR)[TiM]O_3$ oxide.

In the step of (Step A1), both the first raw material and the second raw material may be subjected to pulverization according to the particle size of the raw material powder at the time of mixing the raw material powders. Mixing of raw material powders may be either wet mixing using pure water or ethanol or dry mixing, but when dry mixing is performed, the compositional deviation can be more successfully prevented. Incidentally, different A compound, Bi compound and Ti compound other than $A_2CO_3$, $Bi_2O_3$, $TiO_2$ and the like may also be used as the first raw material. Similarly, different Ba compound and Ti compound other than $BaCO_3$, $TiO_2$ and the like may be also be used as the second raw material.

Calcination of the $(BiA)TiO_3$-based first raw material of (Step A2) is described in detail.

The calcination temperature of the first raw material is from 700° C. to 950° C. If the calcination temperature is less than 700° C., unreacted $A_2CO_3$ or $A_2O$ not reacted with Bi or Ti may react with water in the in-furnace atmosphere or with the solvent to generate heat in the case of wet mixing, and the compositional formulation may deviate from the desired values, whereby the PTC characteristics are likely to become unstable. On the other hand, if the calcination temperature exceeds 950° C., vaporization of Bi proceeds to cause a compositional deviation, whereby production of a heterophase is promoted.

The calcination time is preferably from 0.5 to 10 hours. If the calcination time is less than 0.5 hours, for the same reasons as in the case where the calcination temperature is less than 700° C., the obtained PTC characteristics are likely to be non-stabilized. If the calcination temperature exceeds 10 hours, for the same reasons as in the case where the calcination temperature exceeds 950° C., production of a heterophase is readily promoted.

The calcination of the first raw material is preferably performed in the atmosphere.

If the compositional formulation of the second raw material is a compositional formulation where both R and M are not added, a room-temperature resistivity is increased, and therefore, at least either R or M is preferably added as an essential element.

Calcination of the $(BaR)[TiM]O_3$-based second raw material of (Step A2) is described in detail.

The calcination temperature of the second raw material is from 900 to 1,300° C. If the calcination temperature is less than 900° C., $(BaR)[TiM]O_3$ is not completely formed, and BaO decomposed from BaCO$_3$ may partially react with water or remaining BaCO$_3$ may partially dissolve in water, leaving the possibility of causing a compositional deviation to involve variation in the characteristics.

On the other hand, if the calcination temperature exceeds 1,300° C., mutual sintering disadvantageously occurs in a part of the calcined powder to inhibit formation of a solid solution with the (BiA)TiO$_3$ calcined powder that is mixed later.

The calcination time is preferably 0.5 hours or more. A calcination time of less than 0.5 hours gives rise to a compositional deviation.

The calcination of the second raw material is preferably performed in the atmosphere.

Figure 5:
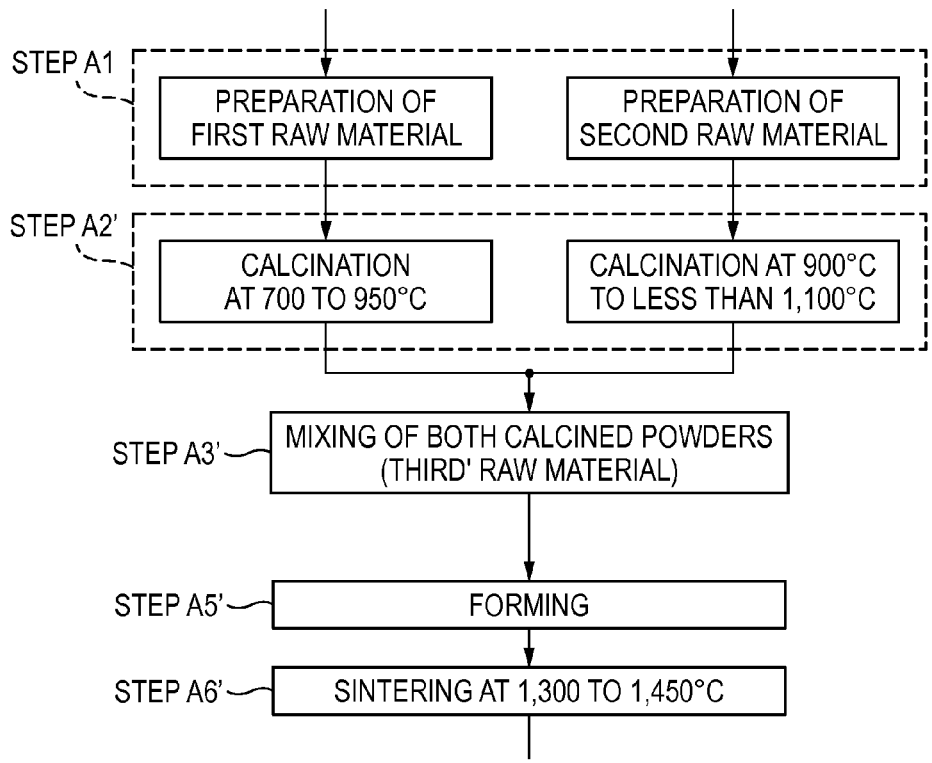
FIG. 5 is a view illustrating a conventional production method.

In (Step A2), the calcination temperature of the second raw material is preferably 1,100° C. or more and less than 1,300° C. Within this range, a portion having a high Ba concentration or Ti concentration can be prevented from remaining in the second raw material after calcination, and by performing the later-described heat treatment, the semiconductor ceramic composition of the present invention, in which the Bi concentration becomes locally high, is readily obtained. Incidentally, FIG. 5 shows the outline of the production method described in Patent Document 2. In the production method described in Patent Document 2, the second raw material is calcined at less than 1,100° C.

(Step A3) is described in detail.

Respective calcined powders are combined each in a predetermined amount and mixed to prepare a third raw material. Mixing may be either wet mixing using pure water or ethanol or dry mixing, but dry mixing is preferably performed, because the compositional deviation can be more successfully prevented. Also, according to the particle size of the calcined powder, pulverization may be performed after mixing or pulverization may be performed simultaneously with mixing. The average particle size of the calcined powder after mixing and pulverization is preferably from 0.5 μm to 7.0 μm, more preferably from 0.8 μm to 3.0 μm.

(Heat Treatment)

(Step A4) is described in detail.

The third raw material is heat-treated at 900° C. to 1,250° C. The heat treatment temperature is preferably a temperature at which both compositional formulations are caused by this step to show the diffraction peak of X-ray diffraction at the same position, that is, enter a solid solution state. If the temperature is less than 900° C., Bi does not sufficiently diffuse, and if the temperature exceeds 1,250° C., since the melting point of the (BiA)TiO$_3$-based composition is around 1,250° C., Bi evaporates into the in-furnace atmosphere. In order to prevent evaporation of Bi, the heat treatment is preferably performed at a low temperature, but if the temperature is too low, the heat treatment must be performed for a long time. The heat treatment temperature is more preferably from 1,000° C. to 1,200° C.

The heat treatment time is preferably from 0.5 to 20 hours. If the time is less than 0.5 hours, a solid solution of the (BaR)[TiM]O$_3$-based calcined powder and the (BiA)TiO$_3$-based calcined powder is not stabilized and unstable PTC characteristics are obtained. On the other hand, if the time exceeds 20 hours, the vaporization amount of Bi increases, and a compositional deviation is likely to occur. The heat treatment time is preferably from 1 to 12 hours, more preferably from 1.5 to 6 hours. The heat treatment of the third raw material is preferably performed in the atmosphere.

Figure 6:
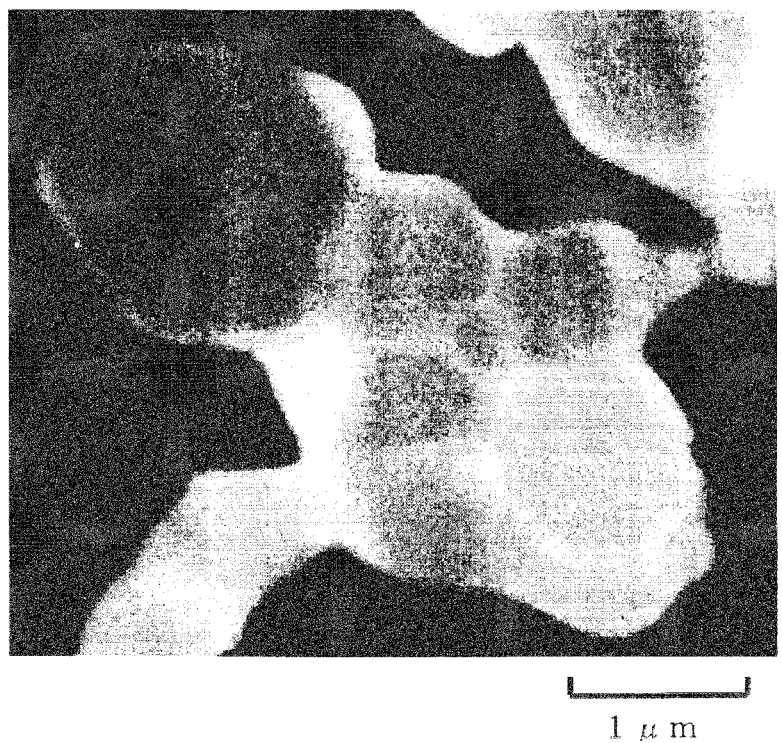
FIG. 6 is a structure observation photograph of the raw material after heat treatment of the present invention.

FIG. 6 is an SEM observation photograph of the third raw material after heat treatment. As shown in FIG. 6, when a heat treatment is applied to the third raw material, a crystal where the Bi concentration is high only in the contoured part of the crystal grain (a crystal where the crystal periphery is in a pale color), is observed. However, if the heat treatment time exceeds 20 hours, the contoured part having a high Bi concentration disappears, and the crystal becomes substantially a crystal having a uniform Bi concentration, as a result, a semiconductor ceramic composition having a crystal grain specified in the present invention is not obtained after sintering.

(Addition of Y)

After heat-treating the third raw material, a Y raw material may be added to the third raw material. By this addition, the change over time of PTC characteristics of the obtained semiconductor ceramic composition can be reduced. Addition of a Y raw material after heat treatment enables aggregation of Y between crystal grains (at the grain boundary or triple boundary) in the semiconductor ceramic composition, whereby the effect of reducing the change over time can be more increased.

Also, the Y raw material can reduce the room-temperature resistivity to 150 Ωcm or less and therefore, the normalized withstand voltage is easily raised. Furthermore, when the Y raw material is added and the sintering temperature in (Step A6) described later is set to 1,380° C. or more, the effect of reducing the change over time is more increased.

For example, the amount of the Y raw material is preferably, in terms of Y$_2$O$_3$, from 0.5 mol % to 4.0 mol % based on the entire raw material (including the Y raw material) of the semiconductor ceramic composition. By the addition within this range, the room-temperature resistivity can be reduced to 150 Ωcm or less and therefore, the normalized withstand voltage is easily raised. Furthermore, when the Y raw material is added and the sintering temperature is set to 1,380° C. or more, an effect of more reducing the change over time of PTC characteristics is also obtained. The amount added of the Y raw material is preferably from 0.7 mol % to 3.0 mol %. The preferable amount of the Y raw material added is from 0.6 mol % to 3.0 mol % and in this case, the change over time can be made to be 50% or less. The more preferable range is from 0.9 mol % to 2.5 mol %, and at this time, the change over time can be made to be 20% or less.

As the Y raw material, a Y oxide such as BiYO$_3$ and Y$_2$O$_3$ can also be used.

Furthermore, by the addition of an oxide containing Ba and Ti, a semiconductor ceramic composition having a high heat-resistant temperature can be obtained. Hereinafter, the oxide containing Ba and Ti is sometimes referred to as BaTi oxide.

In any one step of (Step A1) to (Step A4), an Si raw material in an amount of 3.0 mol % or less in terms of SiO$_2$ and a Ca raw material in an amount of 4.0 mol % or less in terms of CaO, based on the entire raw material of the semiconductor ceramic composition, are preferably added. The Si raw material can inhibit the abnormal growth of crystal grain and at the same time, can facilitate the control of electrical resistivity, and the Ca raw material can enhance the low-temperature sinterability. As for both raw materials, if the material is added in an amount of more than the above-described limiting amount, the composition may not exhibit semiconductivity.

(Step A5) is described in detail.

The material after the heat treatment is formed. Before forming, the pulverized powder may be granulated in a granulating device, if desired. The compact density after forming is preferably from 2.5 to 3.5 g/cm$^3$.

(Step A6) is described in detail.

The sintering is performed at a sintering temperature of 1,300° C. to 1,450° C. If the sintering temperature is less than 1,300° C., sintering becomes insufficient. If the sintering temperature exceeds 1,450° C., the temperature coefficient α of resistance may become small or the heat resistance may be reduced. The sintering temperature is preferably 1,420° C. or less, more preferably 1,400° C. or less.

The sintering is preferably performed in the atmosphere, in a reductive atmosphere or in an inert gas atmosphere with a low oxygen concentration.

The sintering time is preferably from 1 to 10 hours. If the sintering time is less than 1 hour, sintering becomes insufficient. If the sintering time exceeds 10 hours, the Bi concentration within the crystal grain may be homogenized to reduce the temperature coefficient α of resistance. The sintering time is more preferably from 2 to 6 hours.

As a more preferable sintering method, sintering is performed in an atmosphere having an oxygen concentration of 200 ppm or less, whereby a semiconductor ceramic composition having a large temperature coefficient of resistance in a high temperature region (at the Curie temperature or more) while keeping the room-temperature resistivity low can be obtained. In general usage, a semiconductor ceramic composition having a room-temperature resistivity of 200 or less is required.

On the other hand, by performing the sintering in an atmosphere having an oxygen concentration of 3,000 ppm or more, a semiconductor ceramic composition having a large temperature coefficient of resistance in a high temperature region (at the Curie temperature or more) can be obtained. In this case, the semiconductor ceramic composition has a high room-temperature specific ratio of 10,000 Ωcm or more and can be used as a PTC heater for an electric car.

In any one step of (Step A1) to (Step A5), an oxide containing Ba and Ti, which becomes a liquid phase at a temperature of 1,300° C. to 1,450° C., is preferably mixed. The oxide containing Ba and Ti is preferably added in an amount of 0.1 mol % to 1.0 mol % based on the entire raw material (including the oxide containing Ba and Ti) of the semiconductor ceramic composition.

In the calculation of mol % of the oxide containing Ba and Ti, the mol of each of the (BiA)TiO$_3$-based first raw material, the (BaR)[TiM]O$_3$-based second raw material, the Y raw material and the oxide containing Ba and Ti is calculated, and the mol of the oxide containing Ba and Ti is calculated assuming that the sum total of the mols of all raw materials is 100%.

As the oxide containing Ba and Ti, oxides represented by the composition formula of $Ba_6Ti_{17}O_{40}$, $BaTi_2O_5$, $Ba_4Ti_{13}O_{30}$, $BaTi_3O_7$, $BaTi_4O_9$, $Ba_2Ti_9O_{20}$ or $Ba_2TiO_5$ can be applied. The temperature coefficient α of resistance can be prevented from becoming small even when the sintering temperature is low. In addition, a semiconductor ceramic composition having a crystal with the Bi concentration distribution of the present invention is readily obtained. Among others, $Ba_6Ti_{17}O_{40}$ is preferably used as the oxide containing Ba and Ti. The above-described numerical range is also a preferable range particularly when $Ba_6Ti_{17}O_{40}$ is used.

By adding the oxide containing Ba and Ti, the temperature coefficient α of resistance can be prevented from becoming small even when the sintering temperature varies, and the characteristics can be stably obtained.

Also, by adding the oxide containing Ba and Ti, the change over time of PTC characteristics can be reduced.

In a lead-free semiconductor ceramic composition using Bi and an alkali metal, when a void is not formed in the inside, a Schottky barrier may be formed on the contact surface between the semiconductor ceramic composition and the electrode, but a Schottky barrier is not formed inside the semiconductor ceramic composition, giving rise to a problem that the temperature coefficient of resistance decreases over time. The addition of the oxide containing Ba and Ti after the heat treatment facilitates the production of a void inside the semiconductor ceramic composition. It is inferred that thanks to this void production, the change over time of PTC characteristics can be reduced.

The semiconductor ceramic composition of the present invention is described in detail below.

The semiconductor ceramic composition of the present invention has a crystal in which a portion of Ba in BaTiO$_3$-based oxide is substituted by Bi and A. Among others, it is preferable to have a crystal grain which is represented by a composition formula of $[(BiA)_x(Ba_{1-y}R_y)_{1-x}][Ti_{1-z}M_z]O_3$ (wherein A is at least one kind of Na, Li and K. R is at least one kind of rare earth elements including Y, and M is at least one kind of Nb, Ta and Sb) in which x, y and z satisfy 0<x≤0.2, 0≤y≤0.02 and 0≤z≤0.01 (provided that y+z>0).

When x is in the range of more than 0 and 0.2 or less, the Curie temperature can be from 130° C. to 200° C. If x exceeds 0.2, a heterophase is readily produced, and this is not preferred. A semiconductor ceramic composition in which x is 0 does not cause increase in interface resistance and therefore, the effect of reducing the change over time cannot be fully utilized.

In the case of a compositional formulation where both R and M are not added (y=z=0), the room-temperature resistivity exceeds 200 Ωcm and when a heater element used for general usage is fabricated, the efficiency decreases. For this reason, y and z satisfy y+z>0. However, it is not necessary to add both R and M as essential elements, and at least either R or M one may be used.

When z=0, y of R is preferably a value in the range of 0<y≤0.02. If y is 0, the composition does not exhibit semiconductivity, whereas if y exceeds 0.02, the room-temperature resistivity becomes large and these are not preferred. The atomic valence can be controlled by changing the value of y. However, in the case of controlling the atomic valence of the composition in a system where a portion of Ba of the BaTiO$_3$-based oxide is substituted by Bi and A, if a trivalent cation is added as a semiconducting element, the semiconducting effect is reduced due to the presence of the monovalent A ion, thereby giving rise to a problem that the room-temperature resistivity increases. Therefore, the more preferable range is 0.002<y≤0.02. R is at least one or more elements selected from rare earths (Sc, Y, La, Ce, Pr, Nd, Pm, Sm, Eu, Gd, Tb, Dy, Ho, Tb, Tm, Yb, Lu), and among others, La is preferred, because excellent PTC characteristics are obtained.

When y=0, the preferable range of z indicating the M amount is 0<z≤0.01. If z is 0, the atomic valence cannot be controlled, failing in causing the composition to exhibit semiconductivity, whereas if z exceeds 0.01, the room-temperature resistivity may increase or the Curie temperature may drop, and this is not preferred. A more preferable range is 0.001≤z≤0.005. Among others, M is preferably Nb, because excellent PTC characteristics are obtained.

The ratio of Bi and A may be 1:1, and the present invention encompasses a case where although the ratio at the time of combining the materials is 1:1, a deviation is caused in the ratio of Bi and A due to vaporization of Bi in the step of calcining or sintering Bi and the ratio is not 1:1 in the sintered body. The acceptable range is Bi:A=0.78 to 1.55:1, and within this range, the increase of a heterophase can be inhibited, so that the room-temperature resistivity can be prevented from increasing or changing over time. A more preferable range is Bi:A=0.90 to 1.2:1. As described later in Examples, an effect of enhancing the Curie temperature is obtained by setting the Bi/A ratio to be more than 1.

Out of R that is a rare earth element, Y and the like may segregate outside the crystal grain. In the case when R segregates outside the crystal grain, y in the composition formula of crystal grain is 0<y≤0.02, whereas in the composition formula of the entire semiconductor ceramic composition, y is allowable within the range of 0<y≤0.05.

That is, in the semiconductor ceramic composition, the composition formula is represented by $[(BiA)_x(Ba_{1-y}R_y)_{1-x}][Ti_{1-z}M_z]O_3$ (wherein A is at least one kind of Na, Li and K, R is at least one kind of rare earth elements including Y, and M is at least one kind of Nb, Ta and Sb) in which x, y and z satisfy 0<x≤0.2, 0≤y≤0.05 and 0≤z≤0.01 (provided that y+z>0). The value of y differs from that in the composition formula of crystal grain, but the reasons for limitations on the upper limit and lower limit of each of x, y and z are the same as the reasons for limitations in the compositional formulation of crystal grain, and their descriptions are omitted.

Incidentally, in the case of using the above-described Si raw material and Ca raw material, Si and Ca may be contained in the composition formula above.

In the present invention, the evaluation methods of temperature coefficient α of resistance, room-temperature resistivity $R_{25}$, change over time, heat-resistant temperature $T_L$, withstand voltage $V_0$, and normalized withstand voltage $V_L$ were performed as follows.

(Temperature Coefficient α of Resistance)

The temperature coefficient α of resistance was calculated by measuring the resistance-temperature characteristics while raising the temperature of the semiconductor ceramic composition to 260° C. in a constant-temperature bath.

Incidentally, the temperature coefficient α of resistance is defined by the following formula:

$$\alpha = (\ln R_L - \ln R_C) \times 100/(T_L - T_C).$$

As shown in FIG. 1 (abscissa: temperature, ordinate (logarithmic expression): resistivity), $R_L$ is the maximum electrical resistivity, $T_L$ is the heat-resistant temperature showing $R_L$, $T_C$ is the Curie temperature, and $R_C$ is the electrical resistivity at $T_C$. Here, the Curie temperature $T_C$ is defined as a temperature at which the electrical resistivity becomes double the room-temperature resistivity $R_{25}$.

(Room-Temperature Resistivity $R_{25}$)

The room-temperature resistivity $R_{25}$ (Ωcm) was measured at 25° C. by a four-terminal method.

(Change Over Time)

The change over time was determined from the rate of change in resistance.

The semiconductor ceramic composition of the present invention was incorporated into a heater with an aluminum fin, and a voltage of 13 V was applied for 500 hours while cooling the system at a wind velocity of 4 m/s. During electrification, the temperature of the semiconductor ceramic composition was adjusted by water cooling to fall in the range of 80 to 100° C. The room-temperature resistivity at 25° C. after the electrification test was measured, and the difference in the room-temperature resistivity between before the electrification test and after the electrification for 500 hours was divided by the room-temperature resistivity before the electrification test to determine the rate of change in resistance (%), whereby the change over time was examined.

The change over time is defined by the following formula:

{(room-temperature resistivity when electrified for 500 hours)−(room-temperature resistivity before electrification test)}/(room-temperature resistivity before electrification test)×100(%).

(Heat-Resistant Temperature $T_L$)

An electrode was formed on both surfaces of a plate-like semiconductor ceramic composition and by measuring the resistance value while raising the temperature in a heat treatment furnace, the value $T_L$ when the resistance takes a maximum value as shown in FIG. 1 is defined as the heat-resistant temperature.

(Withstand Voltage $V_0$ and Normalized Withstand Voltage $V_L$)

Figure 2:
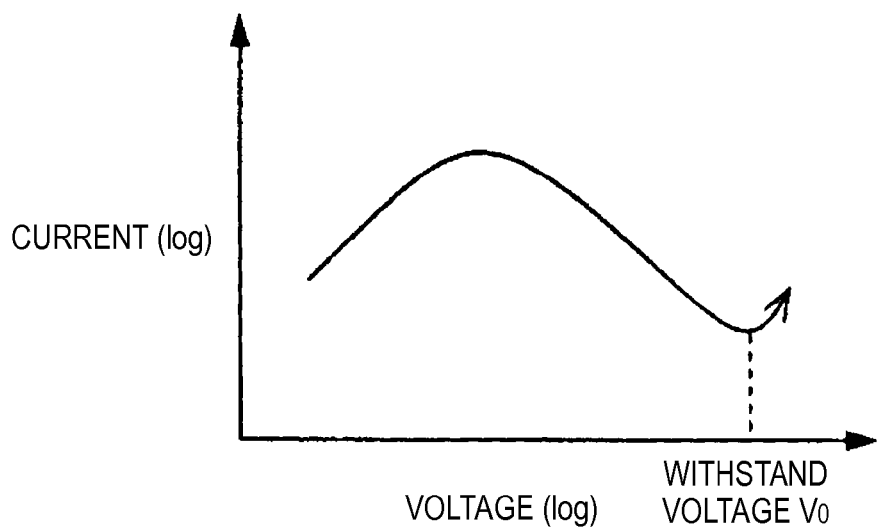
FIG. 2 is a view for explaining the withstand voltage of the semiconductor ceramic composition.

An electrode was formed on both surfaces of a plate-like semiconductor ceramic composition, and a voltage value when the current takes a local minimum value as shown in FIG. 2 was measured. Thereafter, the voltage value is divided by the thickness (unit: mm) of the plate-like semiconductor ceramic composition, and the obtained value was defined as the withstand voltage ($V_0$). Furthermore, this withstand voltage ($V_0$) was divided the above-described room-temperature resistivity $R_{25}$ (Ωcm), and the obtained value was defined as the normalized withstand voltage ($V_L$). Incidentally, the voltage value was measured using a measuring instrument (Model No. PSF800H) manufactured by Nikke Techno System.

Example A1

As shown in FIG. 3, a $(BiA)TiO_3$-based first raw material and a $(BaR)[TiM]O_3$-based second raw material were prepared as the raw material (Step A1). In this Example, raw material powders of $Na_2CO_3$, $Bi_2O_3$ and $TiO_2$ were prepared as the $(BiA)TiO_3$-based first raw material, combined to provide $(Bi_{0.5}Na_{0.5})TiO_3$ where the molar ratio Bi/Na of Bi and Na is 1.0, and dry mixed. Also, raw material powders of $BaCO_3$, $TiO_2$ and $La_2O_3$ were prepared as the $(BaR)[TiM]O_3$-based second raw material, combined to provide $(Ba_{0.994}La_{0.006})TiO_3$, and mixed using pure water.

The first raw material was calcined at 700° C. to 950° C., and the second raw material was calcined at 900° C. to 1,300° C. (Step A2). In this Example, the obtained first raw material was calcined at 800° C. for 2 hours in the atmosphere to prepare a $(BiA)TiO_3$-based calcined powder. Also, the second raw material was calcined at 1,200° C. for 4 hours in the atmosphere to prepare a $(BaR)[TiM]O_3$-based calcined powder.

Respective calcined materials were mixed to prepare a third raw material (Step A3). In this Example, the $(BiA)TiO_3$-based calcined powder and the $(BaR)[TiM]O_3$-based calcined powder were mixed to provide $[(Bi_{0.5}Na_{0.5})_{0.085}(Ba_{0.994}La_{0.006})_{0.915}]TiO_3$. The resulting powder was mixed and pulverized in a pot mill by using pure water as the medium until the average particle diameter became from 2.0 μm to 3.0 μm, and then dried to prepare a third raw material.

The third raw material was heat-treated at 900° C. to 1,250° C. (Step A4). In this Example, the third raw material was heat-treated at 1,150° C. for 4 hours in the atmosphere so as to react the $(BiA)TiO_3$-based calcined powder and the $(BaR)[TiM]O_3$-based calcined powder. The heat treatment temperature was set to a temperature at which respective diffraction lines of the $(BiA)TiO_3$-based calcined powder and the $(BaR)[TiM]O_3$-based calcined powder become one line in the X-ray diffraction.

Subsequently, a BaTi oxide represented by $Ba_6Ti_{17}O_{40}$ and $Y_2O_3$ were added each in the amount shown in Table 1 based on the entire raw material of the semiconductor ceramic composition.

Thereafter, the mixture was formed (Step A5). In this Example, PVA was added and mixed, and then granulated. The granulated powder obtained was formed using a monoaxial pressing apparatus, subjected to binder removal at 700° C. and then sintered (Step A6). In this Example, the formed powder was sintered by holding it at 1,360 to 1,440° C. for 4 hours in nitrogen under the condition of an oxygen concentration of 0.007 vol % (70 ppm) to obtain a sintered body.

The sintered body obtained was processed into a plate of 10 mm×10 mm×1.0 mm to produce a test piece, an ohmic electrode was coated thereon, a cover electrode was further coated, and drying at 180° C. and then baking at 600° C. for a holding time of 10 minutes were performed to form electrodes.

The measured results of room-temperature resistivity $R_{25}$, temperature coefficient α of resistance, Curie temperature $T_C$, change over time, heat-resistant temperature $T_L$, withstand voltage $V_0$ and normalized withstand voltage $V_L$ are shown in Table 1.

sented by $[(BiA)_x(Ba_{1-y}R_y)_{1-x}][Ti_{1-z}M_z]O_3$ (wherein A is at least one kind of Na, Li and K, R is at least one kind of rare earth elements including Y, and M is at least one kind of Nb, Ta and Sb) in which x, y and z satisfied $0<x\leq0.2$, $0\leq y\leq0.02$ and $0\leq z\leq0.01$ (provided that y+z>0).

Also, a secondary phase containing Y and a secondary phase not containing Y were present in addition to the crystal grain, and in the secondary phase containing Y, Y amount in a portion distant from the crystal grain was larger than Y amount in a portion adjacent to the crystal grain.

Furthermore, the crystal grain had a higher Y concentration in the outer shell portion than in the center portion within the crystal grain.

TABLE 1

| Number | Sintering Temperature (° C.) | With or Without Heat Treatment | $Ba_6Ti_{17}O_{40}$ (mol %) | $Y_2O_3$ (mol %) | Amount of (BiNa)$TiO_3$ x | Room-Temperature Resistivity $R_{25}$ (Ωcm) |
|---|---|---|---|---|---|---|
| A1-1 | 1360 | done | 0.29 | 0.55 | 0.085 | 62.2 |
| A1-2 | 1400 | done | 0.29 | 0.99 | 0.085 | 43.7 |
| A1-3 | 1440 | done | 0.29 | 0.99 | 0.085 | 46.0 |
| A1-4 | 1440 | done | 0.29 | 1.48 | 0.085 | 39.6 |
| A1-5 | 1440 | done | 0.29 | 1.97 | 0.085 | 30.7 |
| A1-6 | 1440 | done | 0.29 | 2.47 | 0.085 | 27.1 |
| *A1-7 | 1380 | undone | 0.29 | 0.55 | 0.085 | 310.6 |
| *A1-8 | 1380 | undone | 0.29 | 0.7 | 0.085 | 258.2 |

| Number | Temperature Coefficient of Resistance α (%/° C.) | Curie Temperature $T_C$ (° C.) | Change Over Time (%) | Heat-Resistant Temperature $T_L$ (° C.) | Withstand Voltage $V_0$ (V) | Normalized Withstand Voltage $V_L$ ($V_0/R_{25}$) |
|---|---|---|---|---|---|---|
| A1-1 | 4.35 | 159.0 | 349.1 |  | 444 | 7.1 |
| A1-2 | 5.15 | 157.8 | 22.5 | 487 | 454 | 10.4 |
| A1-3 | 5.16 | 154.8 | 7.3 | 469 | 454 | 9.9 |
| A1-4 | 4.57 | 160.0 | 2.1 | 458 | 460 | 11.6 |
| A1-5 | 3.90 | 167.7 | 1.6 | 465 | 470 | 15.3 |
| A1-6 | 3.62 | 168.6 | 1.1 | 491 | 465 | 17.2 |
| *A1-7 | 8.04 | 155.5 | 378.7 | 404 | 578 | 1.9 |
| *A1-8 | 7.84 | 154.7 | 363.7 | 418 | 488 | 1.9 |

As for Samples A1-1 to A1-6 of this Example, the experiment was performed by changing the amount added of $Y_2O_3$ in the range of 0.55 to 2.47 mol %. The room-temperature resistivity tends to be reduced by the addition of $Y_2O_3$, making it possible to raise the normalized withstand voltage $V_L$. If the sintering temperature is less than 1,380° C. as in Sample A1-1, the effect of reducing the room-temperature resistivity tends to be lowered and therefore, in the case of adding $Y_2O_3$, the sintering temperature is preferably set to 1,380° C. or more. In this connection, the $Y_2O_3$ amount is preferably 0.55 mol % or more, because the effect of reducing the room-temperature resistivity $R_{25}$ is satisfactorily obtained. Also, when the amount added of Y is large, the change over time tends to be lessened.

The semiconductor ceramic composition obtained in this Example has a crystal grain in the inside thereof. The crystal grain has a region between a center portion and an outer shell portion within the crystal grain, in which when Bi concentration is measured in a radial direction within the crystal grain, the Bi concentration in the region is higher than both Bi concentration in the center portion and Bi concentration in the outer shell portion. The maximum value of the Bi concentration is 0.4 mol % or more. The middle portion has a concentration of 3 times or more greater than the Bi concentration in the center portion. Also, the outer shell portion has a concentration of 1.5 times or more greater than the Bi concentration in the center portion.

The compositional formulation of the crystal grain was examined, as a result, the composition formula was repre- Comparative Examples A1-7 and A1-8

Semiconductor ceramic compositions of Comparative Examples A1-7 and A1-8 were obtained by the production method shown in FIG. 5.

A (BiA)$TiO_3$-based first raw material and a (BaR)[TiM]$O_3$-based second raw material were prepared as the raw material (Step A1). In these Comparative Examples, raw material powders of $Na_2CO_3$, $Bi_2O_3$ and $TiO_2$ were prepared as the (BiA)$TiO_3$-based first raw material, combined to provide $(Bi_{0.5}Na_{0.5})TiO_3$ where the molar ratio Bi/Na of Bi and Na is 1.0, and dry mixed. Also, raw material powders of $BaCO_3$, $TiO_2$ and $La_2O_3$ were prepared as the (BaR)[TiM]$O_3$-based second raw material, combined to provide $(Ba_{0.994}La_{0.006})TiO_3$, and mixed using pure water.

The first raw material was calcined at 700° C. to 950° C., and the second raw material was calcined at 900° C. to 1,300° C. (Step A2'). In these Comparative Examples, the obtained first raw material was calcined at 800° C. for 2 hours in the atmosphere to prepare a (BiNa)$TiO_3$-based calcined powder. Also, the obtained second raw material was calcined at 900° C. for 4 hours in the atmosphere to prepare a (BaR)[TiM]$O_3$-based calcined powder.

Respective calcined materials were mixed to prepare a third raw material (Step A3'). In these Comparative Examples, the (BiA)$TiO_3$-based calcined powder and the (BaR)[TiM]$O_3$-based calcined powder were mixed to provide $[(Bi_{0.5}Na_{0.5})_{0.085}(Ba_{0.994}La_{0.06})_{0.915}]TiO_3$ and make a third' raw material.

To the third' raw material, a BaTi oxide represented by $Ba_6Ti_{17}O_{40}$ and $Y_2O_3$ were added each in the amount shown in Table 1 based on the entire raw material of the semiconductor ceramic composition. This material was mixed and pulverized in a pot mill by using pure water as the medium until the average particle diameter became from 2.0 μm to 3.0 μm, and then dried.

Thereafter, the raw material was formed (Step A5'). In these Comparative Examples, PVA was added and mixed, and then granulated. The granulated powder obtained was formed using a monoaxial pressing apparatus, subjected to binder removal at 700° C. and then sintered (Step A6').

Thus, in these Comparative Examples, the third raw material was not subjected to a heat treatment after obtaining the material. Incidentally, in these Comparative Examples, the formed powder was sintered by holding it at 1,380° C. for 4 hours in nitrogen under the condition of an oxygen concentration of 0.007 vol % (70 ppm) to obtain a sintered body.

The measured results of temperature coefficient α of resistance, room-temperature resistivity $R_{25}$, change over time, heat-resistant temperature $T_L$, withstand voltage $V_0$ and normalized withstand voltage $V_L$ are shown in Table 1. In the Table, Comparative Example is marked with *.

In the semiconductor ceramic composition produced using the production method of the present invention, the normalized withstand voltage $V_L$ ($V_0/R_{25}$) is 3.0 or more, and in this Example, the normalized withstand voltage $V_L$ was 7.0 or more. On the other hand, in the semiconductor ceramic compositions of Comparative Examples, the normalized withstand voltage $V_L$ was less than 2.0. It is understood that the normalized withstand voltage $V_L$ is enhanced by applying the production method of the present invention.

Incidentally, the semiconductor ceramic compositions of Comparative Examples have a high withstand voltage ($V_0$), because the room-temperature resistivity $R_{25}$ is high.

Figure 17:
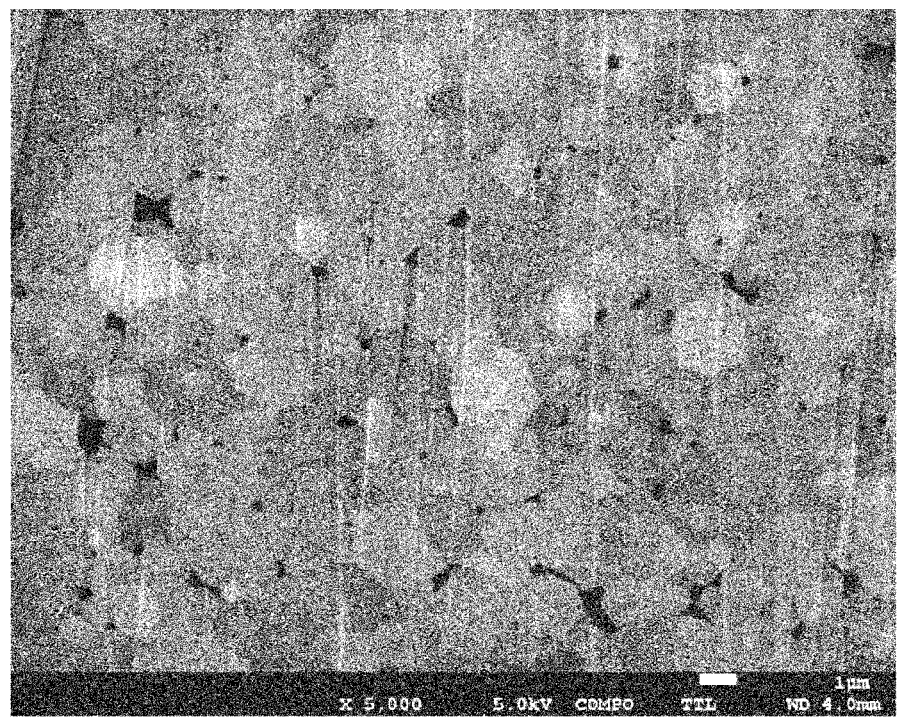
FIG. 17 is a structure observation photograph of the semiconductor ceramic composition of Comparative Example.

FIG. 17 shows an SEM photograph of the semiconductor ceramic composition obtained in Comparative Example A1-7.

Within the crystal, the color is white in the center portion and becomes darker closer to the outer shell portion, revealing that the Bi concentration increases from the center portion to the outer shell portion.

Example A2

As shown in FIG. 3, a (BiA)TiO$_3$-based first raw material and a (BaR)[TiM]O$_3$-based second raw material were prepared as the raw material (Step A1). In this Example, raw material powders of $Na_2CO_3$, $Bi_2O_3$ and $TiO_2$ were prepared as the first raw material, combined to provide $(Bi_{0.5}Na_{0.5})TiO_3$ where the molar ratio Bi/Na of Bi and Na is 1.0, and dry mixed. Also, raw material powders of $BaCO_3$, $TiO_2$ and $La_2O_3$ were prepared as the second raw material, combined to provide $(Ba_{0.994}La_{0.006})TiO_3$, and mixed using pure water.

The first raw material was calcined at 700° C. to 950° C., and the second raw material was calcined at 900° C. to 1,300° C. (Step A2). In this Example, the first raw material was calcined at 800° C. for 2 hours in the atmosphere to prepare a (BiA)TiO$_3$-based calcined powder. Also, the second raw material was calcined at 1,200° C. for 4 hours in the atmosphere to prepare a (BaR)[TiM]O$_3$-based calcined powder.

Respective calcined materials were mixed to prepare a third raw material (Step A3). In this Example, the (BiA)TiO$_3$-based calcined powder and (BaR)[TiM]O$_3$-based calcined powder prepared were mixed to provide $[(Bi_{0.5}Na_{0.5})_{0.085}(Ba_{0.994}La_{0.006})_{0.915}]TiO_3$. The mixed calcined powder was mixed and pulverized in a pot mill by using pure water as the medium until the average particle diameter became from 2.0 μm to 3.0 μm, and then dried to prepare a third raw material.

The third raw material was heat-treated at 900° C. to 1,250° C. (Step A4). In this Example, the third raw material was heat-treated at 1,150° C. for 4 hours so as to react the (BiA)TiO$_3$-based calcined powder and the (BaR)[TiM]O$_3$-based calcined powder. The heat treatment temperature was set to a temperature at which respective diffraction lines of the (BiA)TiO$_3$-based calcined powder and the (BaR)[TiM]O$_3$-based calcined powder become one line in the X-ray diffraction.

Subsequently, a BaTi oxide represented by $Ba_6Ti_{17}O_{40}$ and $Y_2O_3$ were added in amounts of 0.29 mol % and 0.99 mol %, respectively.

Thereafter, the mixture was formed (Step A5). In this Example, PVA was added and mixed, and then granulated in a granulating device. The granulated powder obtained was formed using a monoaxial pressing apparatus and subjected to binder removal at 700° C.

Furthermore, the formed powder was sintered (Step A6). In this Example, the formed powder was sintered by holding it at 1,420° C. for 1 hour, 4 hours and 8 hours in nitrogen with an oxygen concentration of 0.01 vol % (100 ppm) to obtain a sintered body.

These sintered bodies were measured in the same manner as in Example A1. The results obtained are shown in Table 2.

TABLE 2

| Number | Sintering Temperature (° C.) | Sintering Time (hr) | $Ba_6Ti_{17}O_{40}$ (mol %) | $Y_2O_3$ (mol %) | Amount of (BiNa)TiO$_3$ x | Room-Temperature Resistivity $R_{25}$ (Ωcm) |
|---|---|---|---|---|---|---|
| A2-1 | 1420 | 1 | 0.29 | 0.99 | 0.085 | 67.9 |
| A2-2 | 1420 | 4 | 0.29 | 0.99 | 0.085 | 54.8 |
| A2-3 | 1420 | 8 | 0.29 | 0.99 | 0.085 | 23.5 |

| Number | Temperature Coefficient of Resistance α (%/° C.) | Curie Temperature $T_C$ (° C.) | Change Over Time (%) | Heat-Resistant Temperature $T_L$ (° C.) | Withstand $V_0$ (V) | Normalized Withstand Voltage $V_L$ ($V_0/R_{25}$) |
|---|---|---|---|---|---|---|
| A2-1 | 7.45 | 153.1 | 140.0 | 468 | 493 | 7.3 |
| A2-2 | 6.08 | 155 | 7.8 | 467 | 454 | 8.3 |
| A2-3 | 4.22 | 158.4 | — | 493 | 355 | 15.1 |

The second raw material was calcined at a temperature of 1,200° C. and at the same time, a step of heat treatment after mixing was provided, whereby a semiconductor ceramic composition having a normalized withstand voltage $V_L$ of 3.0 or more was obtained.

Also, as shown in Samples A2-1 to A2-3, there was a tendency that as the sintering time lengthens, the normalized withstand voltage $V_L$ rises but the withstand voltage drops. When the withstand voltage is dropped, the thickness between electrodes of the semiconductor ceramic composition must be increased to raise the withstand voltage, as a result, the PTC element is large-sized. For this reason, the sintering time is preferably 10 hours or less.

Figure 7:
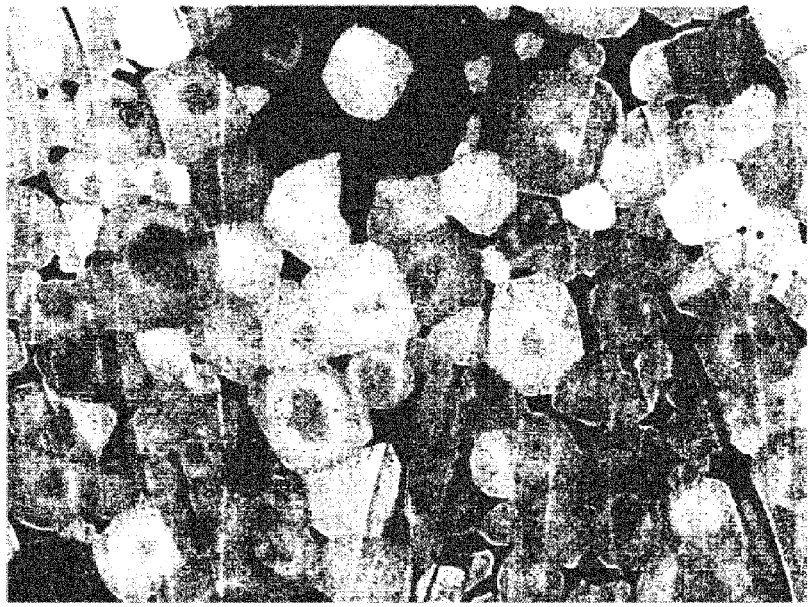
FIG. 7 is a structure observation photograph of a crystal grain in the semiconductor ceramic composition of the present invention.
Figure 8:
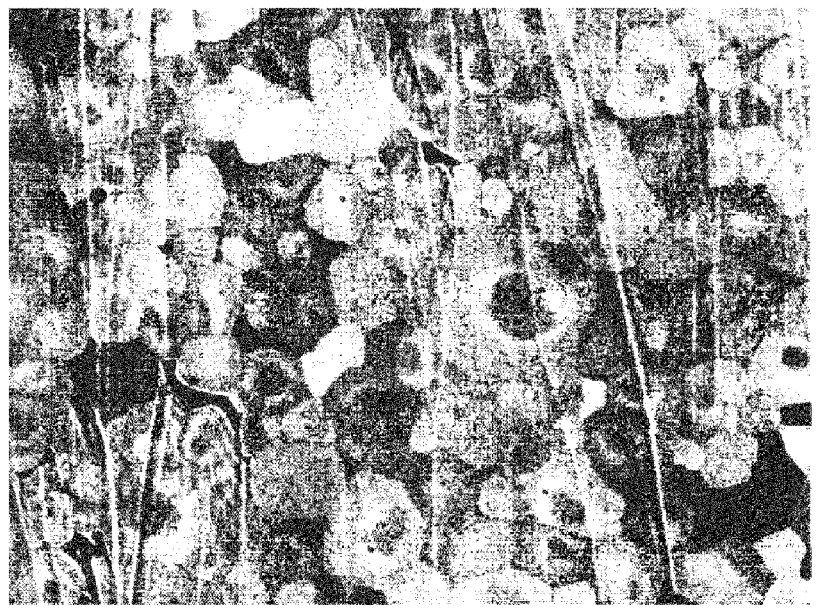
FIG. 8 is an another structure observation photograph of a crystal grain in the semiconductor ceramic composition of the present invention.
Figure 9:
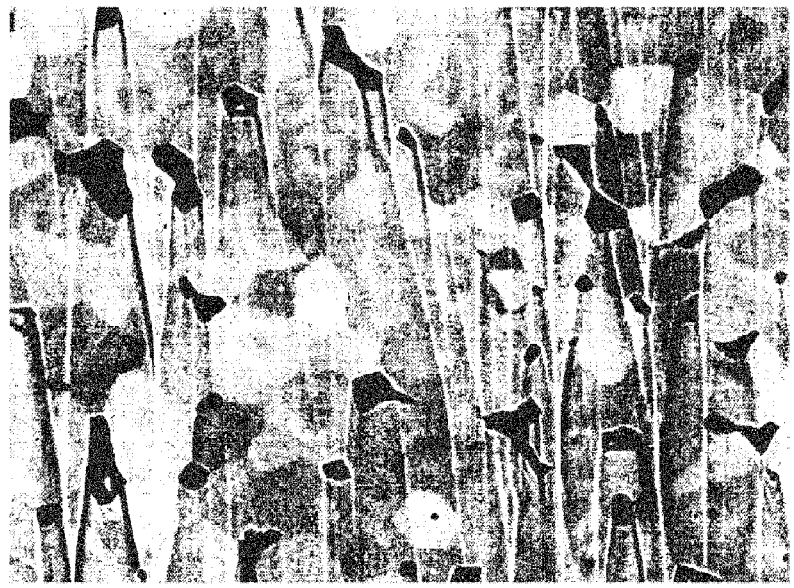
FIG. 9 is a still another structure observation photograph of a crystal grain in the semiconductor ceramic composition of the present invention.

FIG. 7 is a structure observation photograph of Sample A2-1. FIG. 8 is a structure observation photograph of Sample A2-2. FIG. 9 is a structure observation photograph of Sample A2-3.

In the crystals observed in FIGS. 7, 8 and 9, 70% or more based on total number of crystals have a crystal structure in which, as shown in the schematic view of FIG. 4, a nearly annular middle portion 2 (a white annular portion within crystal) having a highest Bi concentration, an outer shell portion 1 (a portion with dark color outside the region 2) having a Bi concentration lower than that in the middle portion 2, and a center portion 3 (a portion with dark color inside the region 2) having a Bi concentration lower than that in the middle portion 2 are present inside the crystal grain 10.

In the present invention, as shown in FIGS. 7 to 9, the outer shell portion 1, the middle portion 2 and the center portion 3 can be discriminated with an eye by the contrasting density in a structure observation photograph such as SEM. Here, FIGS. 7 to 9 are an SEM photograph taken as a reflected electron image by JSM-7001F manufactured by JEOL. The accelerating voltage of the electron beam was set to 5 keV.

Figure 10:
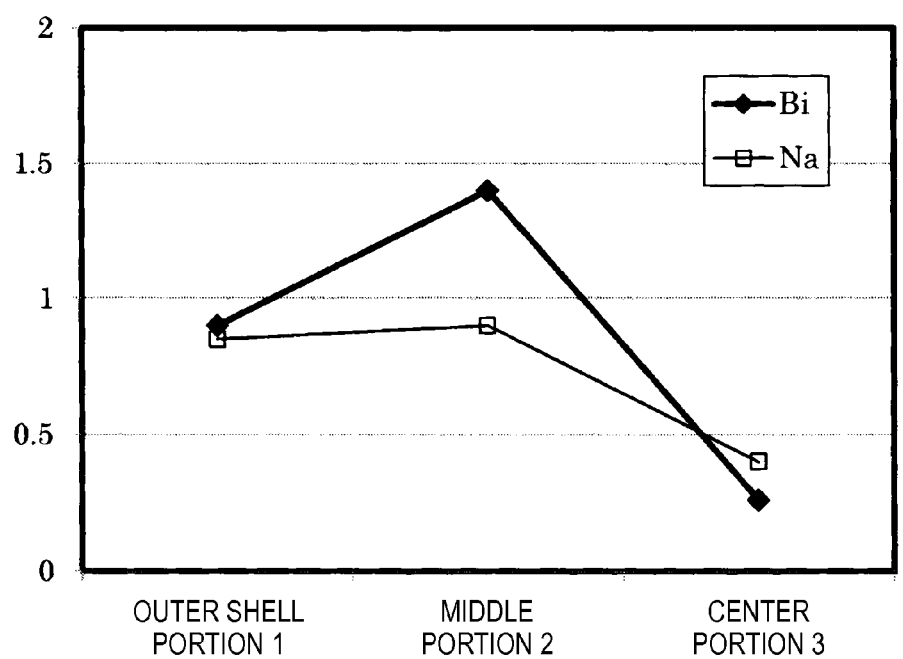
FIG. 10 is a view showing the concentration distribution of Bi and A (Na) in a crystal grain of the semiconductor ceramic composition of the present invention.
Figure 11:
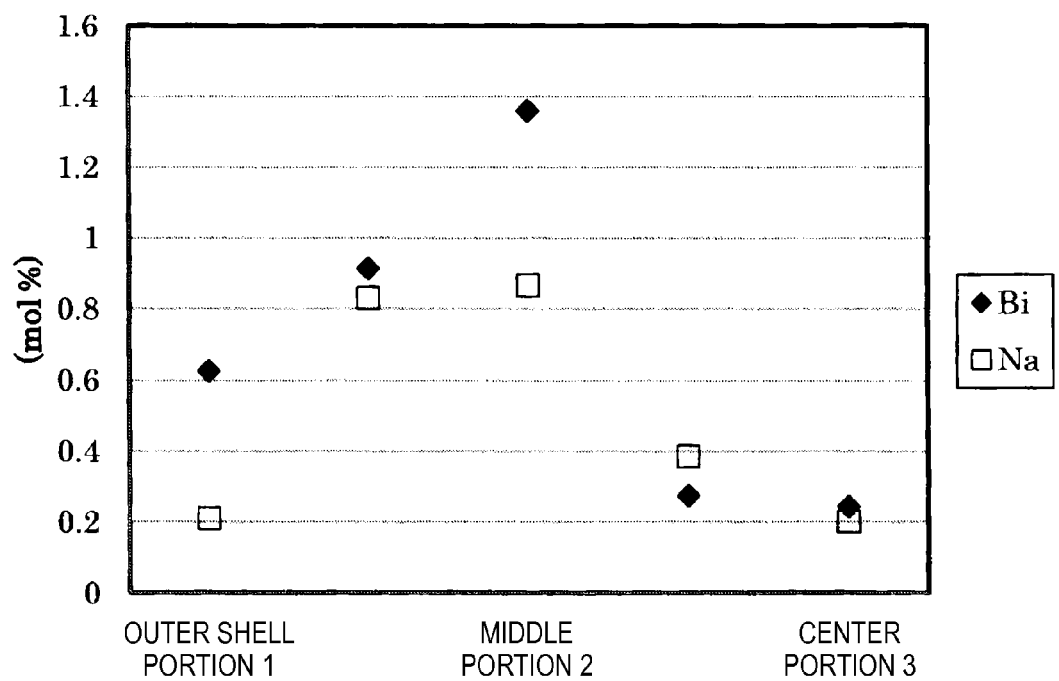
FIG. 11 is a view showing the concentration distribution of Bi and A (Na) in another crystal grain of the semiconductor ceramic composition of the present invention.

A predetermined crystal in Sample A2-2 of FIG. 8 was arbitrarily selected, and the compositional analysis in terms of oxide of outer shell portion, middle portion and center portion was performed. FIG. 10 shows the results of the compositional analysis. Also, another crystal in Sample A2-2 of FIG. 8 was arbitrary selected and after dividing the area from the outer shell portion to the center portion into 4 equal parts, the compositional analysis was performed at respective 5 positions. FIG. 11 shows the results of the compositional analysis.

The measurement of Bi concentration was performed by transmission electron microscope-energy dispersive X-ray spectrometry (TEM-EDX). The concentration was measured using Model HF2100 manufactured by Hitachi, Ltd. as TEM, setting the accelerating voltage to 200 keV, and narrowing the electron beam to a diameter of 1 nm. As the measuring equipment for EDX, VANTAGE manufactured by NORAN was used.

As shown in FIGS. 10 and 11, the Bi concentration in the middle portion is higher than Bi concentrations in the center portion and the outer shell portion. The Bi concentration in the middle portion is 0.4 mol % or more. The Bi concentrations in the center portion and the outer shell portion sometimes exceed 0.4 mol % and in this case, it was confirmed that the Bi concentration in the middle portion is higher and that the Bi concentration in the center portion is lower than the Bi concentration in the outer shell portion.

Furthermore, the middle portion has a concentration of 3 times or more greater than the Bi concentration in the center portion, and the outer shell portion has a concentration of 1.5 times or more greater than the Bi concentration in the center portion.

The compositional formulation of the crystal grain was examined, as a result, the composition formula was represented by $[(BiA)_x(Ba_{1-y}R_y)_{1-x}][Ti_{1-z}M_z]O_3$ (wherein A is at least one kind of Na, Li and K, R is at least one kind of rare earth elements including Y, and M is at least one kind of Nb, Ta and Sb) in which x, y and z satisfied $0<x\leq0.2$, $0\leq y\leq0.02$ and $0\leq z\leq0.01$ (provided that y+z>0).

Also, a secondary phase containing Y and a secondary phase not containing Y were present in addition to the crystal grain, and in the secondary phase containing Y, Y amount in a portion distant from the crystal grain was larger than Y amount in a portion adjacent to the crystal grain.

Furthermore, the crystal grain had a higher Y concentration in the outer shell portion than in the center portion within the crystal grain.

Example A3

The experiment was performed by changing the amount added of the BaTi oxide to provide a so-called Ti-rich compositional formulation where the molar ratio of Ba site and Ti site becomes 0.990 to 0.998:1.

Similarly to Example A1, as shown in FIG. 3, a (BiA)TiO$_3$-based first raw material and a (BaR)[TiM]O$_3$-based second raw material were prepared as the raw material (Step A1). In this Example, raw material powders of Na$_2$CO$_3$, Bi$_2$O$_3$ and TiO$_2$ were prepared as the (BiA)TiO$_3$-based first raw material, combined to provide (Bi$_{0.5}$Na$_{0.5}$)TiO$_3$ where the molar ratio Bi/Na of Bi and Na is 1.0, and dry mixed. Also, raw material powders of BaCO$_3$, TiO$_2$ and La$_2$O$_3$ were prepared as the (BaR)[TiM]O$_3$-based second raw material, combined to provide (Ba$_{0.994}$La$_{0.006}$)TiO$_3$, and mixed using pure water.

The first raw material was calcined at 700° C. to 950° C., and the second raw material was calcined at 900° C. to 1,300° C. (Step A2). In this Example, the obtained first raw material was calcined at 800° C. for 2 hours in the atmosphere to prepare a (BiA)TiO$_3$-based calcined powder. Also, the second raw material was calcined at 1,200° C. for 4 hours in the atmosphere to prepare a (BaR)[TiM]O$_3$-based calcined powder.

Respective calcined materials were mixed to prepare a third raw material (Step A3). In this Example, the (BiA)TiO$_3$-based calcined powder and the (BaR)[TiM]O$_3$-based calcined powder were mixed to provide [(Bi$_{0.5}$Na$_{0.5}$)$_{0.085}$(Ba$_{0.994}$La$_{0.006}$)$_{0.915}$]TiO$_3$. The resulting material was mixed and pulverized in a pot mill by using pure water as the medium until the average particle diameter became from 2.0 μm to 3.0 μm, and then dried to prepare a third raw material.

The third raw material was heat-treated at 900° C. to 1,250° C. (Step A4). In this Example, the third raw material was then heat-treated at 1,150° C. for 4 hours so as to react the (BiA)TiO$_3$-based calcined powder and the (BaR)[TiM]O$_3$-based calcined powder. The heat treatment temperature was set to a temperature at which respective diffraction lines of the (BiA)TiO$_3$-based calcined powder and the (BaR)[TiM]O$_3$-based calcined powder become one line in the X-ray diffraction.

Subsequently, a BaTi oxide represented by Ba$_6$Ti$_{17}$O$_{40}$ and Y$_2$O$_3$ were added each in the amount shown in Table 3 based on the entire raw material of the semiconductor ceramic composition.

Thereafter, the mixture was formed (Step A5). In this Example, PVA was added and mixed, and then granulated. The granulated powder obtained was formed using a monoaxial pressing apparatus and subjected to binder removal at 700° C. (Step A5).

Furthermore, the formed powder was sintered (Step A6). In this Example, the formed powder was sintered by holding it at 1,380° C. and 1,420° C. for 4 hours in nitrogen under the condition of an oxygen concentration of 0.007 vol % (70 ppm) to obtain a sintered body (Step A6).

This sintered body was measured in the same manner as in Example A1. The results obtained are shown in Table 3. There was a tendency that the change over time is smaller in the semiconductor ceramic compositions of A3-2 to A3-9 where the amount added of $Ba_6Ti_{17}O_{40}$ is from 0.72 mol % to 0.94 mol %, than in the semiconductor ceramic composition of A3-1 where the amount added of $Ba_6Ti_{17}O_{40}$ is 0.29 mol %.

The Ti-rich compositional formulation facilitates production of a void inside the semiconductor ceramic composition. In a lead-free semiconductor ceramic composition using Bi and an alkali metal, when a void is not formed, a Schottky barrier may be formed mainly on the contact surface with the electrode. According to the production method of the present invention, voids are easily formed to disperse in the entire composition, and a Schottky barrier is exerted in the entire composition. As a result, the voltage applied from the electrode is formed not only on the surface where the electrode is formed, but also in the inside of the composition, so that the change over time can be reduced.

The semiconductor ceramic composition obtained in this Example has a crystal grain in the inside thereof. The crystal grain has a region between a center portion and an outer shell portion within the crystal grain, in which when Bi concentration is measured in a radial direction within the crystal grain, the Bi concentration in the region is higher than both Bi concentration in the center portion and Bi concentration in the outer shell portion. The maximum value of the Bi concentration is 0.4 mol % or more. The middle portion has a concentration of 3 times or more greater than the Bi concentration in the center portion. Also, the outer shell portion has a concentration of 1.5 times or more greater than the Bi concentration in the center portion.

The compositional formulation of the crystal grain was examined, as a result, the composition formula was represented by $[(BiA)_x(Ba_{1-y}R_y)_{1-x}][Ti_{1-z}M_z]O_3$ (wherein A is at least one kind of Na, Li and K. R is at least one kind of rare earth elements including Y, and M is at least one kind of Nb, Ta and Sb) in which x, y and z satisfied $0<x\leq0.2$, $0\leq y\leq0.02$ and $0\leq z\leq0.01$ (provided that $y+z>0$).

Also, a secondary phase containing Y and a secondary phase not containing Y were present in addition to the crystal grain, and in the secondary phase containing Y, Y amount in a portion distant from the crystal grain was larger than Y amount in a portion adjacent to the crystal grain.

Furthermore, the crystal grain had a higher Y concentration in the outer shell portion than in the center portion within the crystal grain.

TABLE 3

| Number | Sintering Temperature (° C.) | Sintering Time (hr) | $Ba_6Ti_{17}O_{40}$ (mol %) | $Y_2O_3$ (mol %) | Amount of (BiNa)$TiO_3$ x | Room-Temperature Resistivity $R_{25}$ (Ωcm) |
|---|---|---|---|---|---|---|
| A3-1 | 1420 | 4 | 0.29 | 1.48 | 0.085 | 33.8 |
| A3-2 | 1420 | 4 | 0.72 | 1.47 | 0.085 | 113.0 |
| A3-3 | 1420 | 4 | 0.79 | 1.47 | 0.085 | 110.2 |
| A3-4 | 1420 | 4 | 0.86 | 1.47 | 0.085 | 88.9 |
| A3-5 | 1420 | 4 | 0.94 | 1.47 | 0.085 | 134.0 |
| A3-6 | 1380 | 4 | 0.72 | 1.47 | 0.085 | 75.7 |
| A3-7 | 1380 | 4 | 0.79 | 1.47 | 0.085 | 88.7 |
| A3-8 | 1380 | 4 | 0.86 | 1.47 | 0.085 | 110.4 |
| A3-9 | 1380 | 4 | 0.94 | 1.47 | 0.085 | 113.5 |
| *A3-10 | 1380 | 4 | 0 | 0 | 0.085 | 72.3 |

| Number | Temperature Coefficient of Resistance α (%/° C.) | Curie Temperature $T_C$ (° C.) | Change Over Time (%) | Heat-Resistant Temperature $T_L$ (° C.) | Withstand Voltage $V_0$ (V) | Normalized Withstand Voltage $V_L$ ($V_0/R_{25}$) |
|---|---|---|---|---|---|---|
| A3-1 | 4.87 | 158.3 | 13.8 | 464 | 450 | 13.3 |
| A3-2 | 5.51 | 149.2 | 3.9 | 493 | 495 | 4.4 |
| A3-3 | 5.18 | 150.2 | 5.4 | 476 | 489 | 4.4 |
| A3-4 | 4.84 | 151.8 | 2.9 | 484 | 460 | 5.2 |
| A3-5 | 5.29 | 147.8 | 3.9 | 471 | 489 | 3.6 |
| A3-6 | 4.56 | 159.0 | 2.9 | 489 | 471 | 6.2 |
| A3-7 | 4.27 | 157.6 | 4.6 | 486 | 460 | 5.2 |
| A3-8 | 4.45 | 156.2 | 2.6 | 464 | 507 | 4.6 |
| A3-9 | 4.54 | 156.1 | 2.9 | 477 | 501 | 4.4 |
| *A3-10 | 8.53 | 156.6 | 481.4 | 338 | 293 | 4.1 |

Example A4

The experiment was performed by changing the mixing ratio between the (BiA)$TiO_3$-based first raw material and the (BaR)[TiM]$O_3$-based second raw material.

Similarly to Example A1, as shown in FIG. 3, a (BiA)$TiO_3$-based first raw material and a (BaR)[TiM]$O_3$-based second raw material were prepared as the raw material (Step A1). In this Example, raw material powders of $Na_2CO_3$, $Bi_2O_3$ and $TiO_2$ were prepared as the (BiA)$TiO_3$-based first raw material, combined to provide $(Bi_{0.5}Na_{0.5})TiO_3$ where the molar ratio Bi/Na of Bi and Na is 1.0, and dry mixed. Also, raw material powders of $BaCO_3$, $TiO_2$ and $La_2O_3$ were prepared as the (BaR)[TiM]$O_3$-based second raw material, combined to provide $(Ba_{0.994}La_{0.006})TiO_3$, and mixed using pure water.

The first raw material was calcined at 700° C. to 950° C., and the second raw material was calcined at 900° C. to 1,300° C. (Step A2). In this Example, the obtained first raw material was calcined at 800° C. for 2 hours in the atmosphere to prepare a (BiA)$TiO_3$-based calcined powder. Also, the obtained second raw material was calcined at 1,200° C. for 4 hours in the atmosphere to prepare a (BaR)[TiM]$O_3$-based calcined powder.

Respective calcined materials were mixed to prepare a third raw material (Step A3). In this Example, the (BiA)TiO$_3$-based calcined powder and the (BaR)[TiM]O$_3$-based calcined powder were mixed to provide [(Bi$_{0.5}$Na$_{0.5}$)$_{0.085}$(Ba$_{0.994}$La$_{0.006}$)$_{0.915}$]TiO$_3$. The (BiA)TiO$_3$-based calcined powder and the (BaR)[TiM]O$_3$-based calcined powder were mixed by changing the conditions such that in the composition formula [(Bi$_{0.5}$Na$_{0.5}$)$_x$(Ba$_{0.994}$La$_{0.006}$)$_{1-x}$]TiO$_3$, x becomes 0.005, 0.030, 0.055, 0.085, and 0.110. This material was mixed and pulverized in a pot mill by using pure water as the medium until the average particle diameter became from 2.0 μm to 3.0 μm, and then dried.

The third raw material was heat-treated at 900° C. to 1,250° C. (Step A4). In this Example, a heat treatment was performed at 1,150° C. for 4 hours so as to react the (BiA)TiO$_3$-based calcined powder and the (BaR)[TiM]O$_3$-based calcined powder. The heat treatment temperature was set to a temperature at which respective diffraction lines of the (BiA)TiO$_3$-based calcined powder and the (BaR)[TiM]O$_3$-based calcined powder become one line in the X-ray diffraction.

Subsequently, a BaTi oxide represented by Ba$_6$Ti$_{17}$O$_{40}$ and Y$_2$O$_3$ were added each in the amount shown in Table 4 based on the entire raw material of the semiconductor ceramic composition.

Thereafter, the mixture was formed (Step A5). In this Example, PVA was added and mixed, and then granulated. The granulated powder obtained was formed using a monoaxial pressing apparatus and subjected to binder removal at 700° C.

Furthermore, the formed powder was sintered (Step A6). In this Example, the formed powder was sintered by holding it at 1,420° C. for 4 hours in nitrogen under the condition of an oxygen concentration of 0.007 vol % (70 ppm) to obtain a sintered body.

This sintered body was measured in the same manner as in Example A1. The results obtained are shown in Table 4.

The Curie temperature can be shifted to the high temperature side by increasing the value of x that is the amount of the (BiA)TiO$_3$-based calcined powder mixed. However, it is known that if the value exceeds 0.2, the room-temperature specific resistivity disadvantageously comes close to 10$^4$ Ωcm.

The semiconductor ceramic composition obtained in this Example has a crystal grain in the inside thereof. The crystal grain has a region between a center portion and an outer shell portion within the crystal grain, in which when Bi concentration is measured in a radial direction within the crystal grain, the Bi concentration in the region is higher than both Bi concentration in the center portion and Bi concentration in the outer shell portion. The maximum value of the Bi concentration is 0.4 mol % or more. The middle portion has a concentration of 3 times or more greater than the Bi concentration in the center portion. Also, the outer shell portion has a concentration of 1.5 times or more greater than the Bi concentration in the center portion.

The compositional formulation of the crystal grain was examined, as a result, the composition formula was represented by [(BiA)(Ba$_{1-y}$R$_y$)$_{1-x}$][Ti$_{1-z}$M$_z$]O$_3$ (wherein A is at least one kind of Na, Li and K, R is at least one kind of rare earth elements including Y, and M is at least one kind of Nb, Ta and Sb) in which x, y and z satisfied 0<x≤0.2, 0≤y≤0.02 and 0≤z≤0.01 (provided that y+z>0).

Also, a secondary phase containing Y and a secondary phase not containing Y were present in addition to the crystal grain, and in the secondary phase containing Y, Y amount in a portion distant from the crystal grain was larger than Y amount in a portion adjacent to the crystal grain.

Furthermore, the crystal grain had a higher Y concentration in the outer shell portion than in the center portion within the crystal grain.

Example A5

The experiment was performed by changing the Bi/Na ratio of the (BiA)TiO$_3$-based first raw material.

Similarly to Example A1, as shown in FIG. 3, a (BiA)TiO$_3$-based first raw material and a (BaR)[TiM]O$_3$-based second raw material were prepared as the raw material (Step A1). In this Example, raw material powders of Na$_2$CO$_3$, Bi$_2$O$_3$ and TiO$_2$ were prepared as the (BiA)TiO$_3$-based first raw material, combined to provide (Bi$_{0.512}$Na$_{0.488}$)TiO$_3$ where the molar ratio of Bi and Na in the composition formula is 1.05 (Bi:Na=0.512:0.488), and dry mixed. Also, raw material powders were combined provide (Bi$_{0.524}$Na$_{0.476}$)TiO$_3$ where the molar ratio is 1.10 (Bi:Na=0.524:0.476), and dry mixed. In addition, raw material powders of BaCO$_3$, TiO$_2$ and La$_2$O$_3$ were prepared as the (BaR)[TiM]O$_3$-based second raw material, combined to provide (Ba$_{0.994}$La$_{0.006}$)TiO$_3$, and mixed using pure water.

TABLE 4

| Number | Sintering Temperature (° C.) | Sintering Time (hr) | Ba$_6$Ti$_{17}$O$_{40}$ (mol %) | Y$_2$O$_3$ (mol %) | Amount of (BiNa)TiO$_3$ x | Room-Temperature Resistivity R$_{25}$ (Ωcm) |
|---|---|---|---|---|---|---|
| A4-1 | 1420 | 4 | 0.72 | 1.47 | 0.005 | 81.5 |
| A4-2 | 1420 | 4 | 0.72 | 1.47 | 0.030 | 77.5 |
| A4-3 | 1420 | 4 | 0.72 | 1.47 | 0.055 | 68.2 |
| A4-4 | 1420 | 4 | 0.72 | 1.47 | 0.085 | 84.6 |
| A4-5 | 1420 | 4 | 0.72 | 1.47 | 0.110 | 87.6 |

| Number | Temperature Coefficient of Resistance α (%/° C.) | Curie Temperature T$_C$ (° C.) | Change Over Time (%) | Heat-Resistant Temperature T$_L$ (° C.) | Withstand Voltage V$_0$ (V) | Normalized Withstand Voltage V$_L$ (V$_0$/R$_{25}$) |
|---|---|---|---|---|---|---|
| A4-1 | 4.27 | 129.9 | 2.8 | 487 | 454 | 5.6 |
| A4-2 | 4.91 | 139.7 | 3.0 | 472 | 444 | 5.7 |
| A4-3 | 5.26 | 148.7 | 4.1 | 466 | 444 | 6.5 |
| A4-4 | 5.66 | 155.7 | 3.0 | 489 | 450 | 5.3 |
| A4-5 | 6.12 | 167.8 | 3.6 | 475 | 454 | 5.2 |

The first raw material was calcined at 700° C. to 950° C., and the second raw material was calcined at 900° C. to 1,300° C. (Step A2). In this Example, the obtained first raw material was calcined at 800° C. for 2 hours in the atmosphere to prepare a (BiA)TiO$_3$-based calcined powder. Also, the obtained second raw material was calcined at 1,200° C. for 4 hours in the atmosphere to prepare a (BaR)[TiM]O$_3$-based calcined powder.

Respective calcined materials were mixed to prepare a third raw material (Step A3). In this Example, the (BiA)TiO$_3$-based calcined powder and the (BaR)[TiM]O$_3$-based calcined powder were mixed to provide [(Bi$_a$Na$_b$)$_{0.085}$ (Ba$_{0.994}$La$_{0.006}$)$_{0.915}$]TiO$_3$ (provided that the ratio a:b of Bi and Na is the above-described molar ratio). This material was mixed and pulverized in a pot mill by using pure water as the medium until the average particle diameter became from 2.0 μm to 3.0 μm, and then dried to prepare a third raw material.

The third raw material was heat-treated at 900° C. to 1,250° C. (Step A4). In this Example, the third raw material was then heat-treated at 1,150° C. for 4 hours so as to react the (BiA) TiO$_3$-based calcined powder and the (BaR)[TiM]O$_3$-based calcined powder. The heat treatment temperature was set to a temperature at which respective diffraction lines of the (BiA) TiO$_3$-based calcined powder and the (BaR)[TiM]O$_3$-based calcined powder become one line in the X-ray diffraction.

Subsequently, a BaTi oxide represented by Ba$_6$Ti$_{17}$O$_{40}$ and Y$_2$O$_3$ were added each in the amount shown in Table 5 based on the entire raw material of the semiconductor ceramic composition.

Thereafter, the mixture was formed (Step A5). In this Example, PVA was added and mixed, and then granulated. The granulated powder obtained was formed using a mono-axial pressing apparatus and subjected to binder removal at 700° C.

Furthermore, the formed powder was sintered (Step A6). In this Example, the formed powder was sintered by holding it at 1,380 to 1,420° C. for 4 hours in nitrogen under the condition of an oxygen concentration of 0.007 vol % (70 ppm) to obtain a sintered body.

This sintered body was measured in the same manner as in Example A1. The results obtained are shown in Table 5.

TABLE 5

| Number | Sintering Temperature (° C.) | Sintering Time (hr) | Ba$_6$Ti$_{17}$O$_{40}$ (mol %) | Y$_2$O$_3$ (mol %) | Amount of (BiNa)TiO$_3$ x | Room-Temperature Resistivity R$_{25}$ (Ωcm) |
|---|---|---|---|---|---|---|
| A5-1 | 1380 | 4 | 0.29 | 1.47 | 0.085 | 38.8 |
| A5-2 | 1380 | 4 | 0.29 | 1.47 | 0.085 | 36.5 |
| A5-3 | 1380 | 4 | 0.72 | 1.47 | 0.085 | 75.7 |
| A5-4 | 1380 | 4 | 0.79 | 1.47 | 0.085 | 18.8 |
| A5-5 | 1380 | 4 | 0.94 | 1.47 | 0.085 | 16.5 |
| A5-6 | 1400 | 4 | 0.29 | 1.47 | 0.085 | 24.2 |
| A5-7 | 1400 | 4 | 0.29 | 1.47 | 0.085 | 16.8 |
| A5-8 | 1400 | 4 | 0.79 | 1.47 | 0.085 | 118.5 |
| A5-9 | 1400 | 4 | 0.79 | 1.47 | 0.085 | 24.2 |
| A5-10 | 1400 | 4 | 0.94 | 1.47 | 0.085 | 141.6 |
| A5-11 | 1400 | 4 | 0.94 | 1.47 | 0.085 | 16.8 |
| A5-12 | 1420 | 4 | 0.29 | 1.48 | 0.085 | 33.7 |
| A5-13 | 1420 | 4 | 0.29 | 1.47 | 0.085 | 32.4 |
| A5-14 | 1420 | 4 | 0.29 | 1.47 | 0.085 | 26.5 |

| Number | Temperature Coefficient of Resistance α (%/° C.) | Curie Temperature T$_C$ (° C.) | Heat-Resistant Temperature T$_L$ (° C.) | Withstand Voltage V$_0$ (V) | Normalized Withstand Voltage V$_L$ (V$_0$/R$_{25}$) | Bi/Na Ratio |
|---|---|---|---|---|---|---|
| A5-1 | 3 | 169.7 | 390 | 358 | 9.2 | 0.512:0.488 |
| A5-2 | 4.01 | 160.7 | 430 | 441 | 12.1 | 0.524:0.476 |
| A5-3 | 4.56 | 159 | 489 | 485 | 6.4 | 0.500:0.500 |
| A5-4 | 5.52 | 166.2 | 485 | 474 | 25.2 | 0.512:0.488 |
| A5-5 | 5.23 | 161.2 | 410 | 463 | 28.1 | 0.524:0.476 |
| A5-6 | 4.54 | 166.6 | 456 | 463 | 19.1 | 0.512:0.488 |
| A5-7 | 4.18 | 169.6 | 449 | 463 | 27.6 | 0.524:0.476 |
| A5-8 | 5.37 | 152 | 455 | 468 | 3.9 | 0.500:0.500 |
| A5-9 | 5.57 | 161.6 | 506 | 496 | 20.5 | 0.512:0.488 |
| A5-10 | 5.32 | 149.7 | 478 | 480 | 3.4 | 0.500:0.500 |
| A5-11 | 5.08 | 159.1 | 489 | 485 | 28.9 | 0.524:0.476 |
| A5-12 | 4.80 | 158.7 | 492 | 485 | 14.4 | 0.500:0.500 |
| A5-13 | 4.39 | 162.1 | 463 | 463 | 14.3 | 0.512:0.488 |
| A5-14 | 4.27 | 161.6 | 458 | 450 | 17.0 | 0.524:0.476 |

The Curie temperature T$_C$ was enhanced in all samples where the Bi/Na ratio is more than 1, compared with the sample where the Bi/Na ratio is 1. For example, the Curie temperature T$_C$ is high in A5-9 where the Bi/Na ratio is more than 1, compared with A5-8 where the Bi/Na ratio is 1, and similarly, the Curie temperature T$_C$ is high in A5-11 where the Bi/Na ratio is more than 1, compared with A5-10 where the Bi/Na ratio is 1.

Also, the temperature coefficient α of resistance is reduced in the sample where the sintering temperature is 1,420° C., compared with the sample where the sintering temperature is 1,400° C. It is understood from this result that the sintering temperature is more preferably from 1,380° C. to 1,410° C.

The semiconductor ceramic composition obtained in this Example has a crystal grain in the inside thereof. The crystal grain has a region between a center portion and an outer shell portion within the crystal grain, in which when Bi concentration is measured in a radial direction within the crystal grain, the Bi concentration in the region is higher than both Bi concentration in the center portion and Bi concentration in the outer shell portion. The maximum value of the Bi concentration is 0.4 mol % or more. The middle portion has a concentration of 3 times or more greater than the Bi concentration in the center portion. Also, the outer shell portion has a concentration of 1.5 times or more greater than the Bi concentration in the center portion.

The compositional formulation of the crystal grain was examined, as a result, the composition formula was represented by $[(BiA)_x(Ba_{1-y}R_y)_{1-x}][Ti_{1-z}M_z]O_3$ (wherein A is at least one kind of Na, Li and K, R is at least one kind of rare earth elements including Y, and M is at least one kind of Nb, Ta and Sb) in which x, y and z satisfied $0<x\le0.2$, $0\le y\le0.02$ and $0\le z\le0.01$ (provided that y+z>0).

Also, a secondary phase containing Y and a secondary phase not containing Y were present in addition to the crystal grain, and in the secondary phase containing Y, Y amount in a portion distant from the crystal grain was larger than Y amount in a portion adjacent to the crystal grain.

Furthermore, the crystal grain had a higher Y concentration in the outer shell portion than in the center portion within the crystal grain.

Incidentally, even when a rare earth element except for La or an M element (Nb, Ta, Sb) is used as the semiconducting element, the effect of enhancing the normalized withstand voltage $V_L$ was obtained similarly.

Example A6

The effect of the temperature coefficient α of resistance when the heat treatment temperature was set to 1,000° C., 1,150° C. and 1,250° C. was examined. The sintering temperature was set to 1,360° C., 1,380° C., 1,400° C. and 1,420° C.

Figure 12:
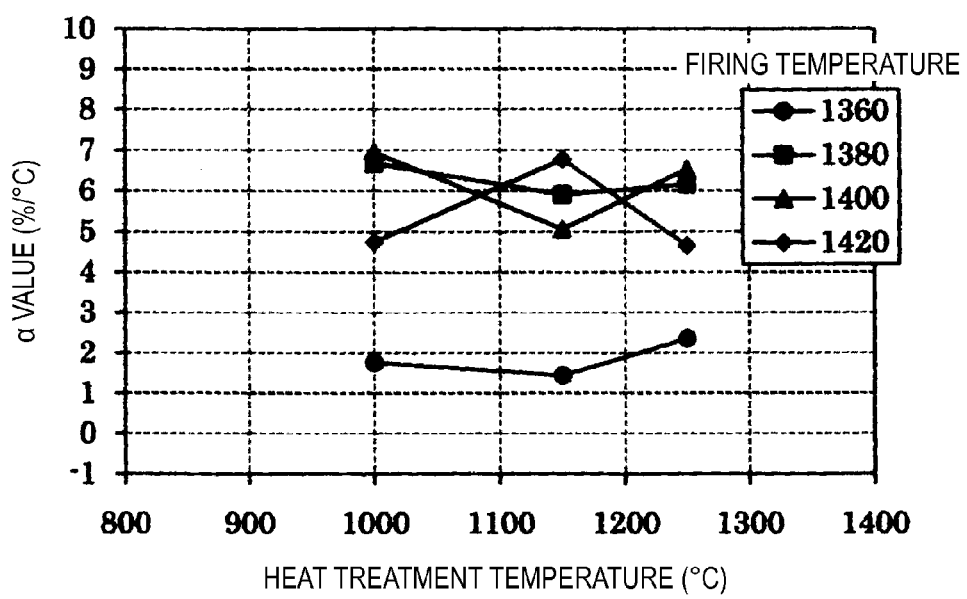
FIG. 12 is a view showing the relationship between the heat treatment temperature and the temperature coefficient α of resistance.

Sintered bodies were produced under the same conditions as in Example A1 except for changing the heat treatment temperature to the above-described temperatures, and measured for the temperature coefficient of resistance. FIG. 12 shows the results. It is understood that the heat treatment performed at any of the temperatures above had a small effect on the temperature coefficient of resistance.

In addition, the normalized withstand voltage $V_L$ was 3.0 or more similarly to other Examples.

The semiconductor ceramic composition obtained in this Example has a crystal grain in the inside thereof. The crystal grain has a region between a center portion and an outer shell portion within the crystal grain, in which when Bi concentration is measured in a radial direction within the crystal grain, the Bi concentration in the region is higher than both Bi concentration in the center portion and Bi concentration in the outer shell portion. The maximum value of the Bi concentration is 0.4 mol % or more. The middle portion has a concentration of 3 times or more greater than the Bi concentration in the center portion. Also, the outer shell portion has a concentration of 1.5 times or more greater than the Bi concentration in the center portion.

The compositional formulation of the crystal grain was examined, as a result, the composition formula was represented by $[(BiA)_x(Ba_{1-y}R_y)_{1-x}][Ti_{1-z}M_z]O_3$ (wherein A is at least one kind of Na, Li and K. R is at least one kind of rare earth elements including Y, and M is at least one kind of Nb, Ta and Sb) in which x, y and z satisfied $0<x\le0.2$, $0\le y\le0.02$ and $0\le z\le0.01$ (provided that y+z>0).

Also, a secondary phase containing Y and a secondary phase not containing Y were present in addition to the crystal grain, and in the secondary phase containing Y, Y amount in a portion distant from the crystal grain was larger than Y amount in a portion adjacent to the crystal grain.

Furthermore, the crystal grain had a higher Y concentration in the outer shell portion than in the center portion within the crystal grain.

Example A7

The effect of the heat treatment temperature on other characteristics was examined.

Step A1 to Step A3 were performed in the same manner as in Example A1.

The third raw material was heat-treated at 900° C. to 1,250° C. (Step A4). In this Example, the third raw material was heat-treated at 1,000° C., 1,150° C. and 1,250° C. each for 4 hours in the atmosphere so as to react the $(BiA)TiO_3$-based calcined powder and the $(BaR)[TiM]O_3$-based calcined powder.

Subsequently, a BaTi oxide represented by $Ba_6Ti_{17}O_{40}$ and $Y_2O_3$ were added in amounts of 0.72 mol % and 1.47 mol %, respectively, based on the entire raw material of the semiconductor ceramic composition.

Thereafter, the mixture was formed (Step A5). In this Example, PVA was added and mixed, and then granulated. The granulated powder obtained was formed using a monoaxial pressing apparatus and subjected to binder removal at 700° C.

Furthermore, the formed powder was sintered (Step A6). In this Example, the formed powder was sintered by holding it at 1,360° C., 1,380° C., 1,400° C. and 1,420° C. each for 4 hours in nitrogen under the condition of an oxygen concentration of 0.007 vol % (70 ppm) to obtain sintered bodies.

The measured results of room-temperature resistivity $R_{25}$, temperature coefficient α of resistance, Curie temperature $T_C$, heat-resistant temperature $T_L$, withstand voltage $V_0$ and normalized withstand voltage $V_L$ are shown in Table 6. In all measured results, excellent heat-resistant temperature, withstand voltage and normalized withstand voltage were obtained.

The semiconductor ceramic composition obtained in this Example has a crystal grain in the inside thereof. The crystal grain has a region between a center portion and an outer shell portion within the crystal grain, in which when Bi concentration is measured in a radial direction within the crystal grain, the Bi concentration in the region is higher than both Bi concentration in the center portion and Bi concentration in the outer shell portion. The maximum value of the Bi concentration is 0.4 mol % or more. The middle portion has a concentration of 3 times or more greater than the Bi concentration in the center portion. Also, the outer shell portion has a concentration of 1.5 times or more greater than the Bi concentration in the center portion.

The compositional formulation of the crystal grain was examined, as a result, the composition formula was represented by $[(BiA)(Ba_{1-y}R_y)_{1-x}][Ti_{1-z}M_z]O_3$ (wherein A is at least one kind of Na, Li and K, R is at least one kind of rare earth elements including Y, and M is at least one kind of Nb, Ta and Sb) in which x, y and z satisfied $0<x\le0.2$, $0\le y\le0.02$ and $0\le z\le0.01$ (provided that y+z>0).

Also, a secondary phase containing Y and a secondary phase not containing Y were present in addition to the crystal grain, and in the secondary phase containing Y, Y amount in a portion distant from the crystal grain was larger than Y amount in a portion adjacent to the crystal grain.

Furthermore, the crystal grain had a higher Y concentration in the outer shell portion than in the center portion within the crystal grain.

TABLE 6

| Number | Sintering Temperature (° C.) | Heat Treatment Temperature (° C.) | Sintering Time (hr) | $Ba_6Ti_{17}O_{40}$ (mol %) | $Y_2O_3$ (mol %) | Amount of (BiNa)$TiO_3$ x |
|---|---|---|---|---|---|---|
| A6-1 | 1360 | 1000 | 4 | 0.72 | 1.47 | 0.085 |
| A6-2 | 1360 | 1150 | 4 | 0.72 | 1.47 | 0.085 |
| A6-3 | 1360 | 1250 | 4 | 0.72 | 1.47 | 0.085 |
| A6-4 | 1380 | 1000 | 4 | 0.72 | 1.47 | 0.085 |
| A6-5 | 1380 | 1150 | 4 | 0.72 | 1.47 | 0.085 |
| A6-6 | 1380 | 1250 | 4 | 0.72 | 1.47 | 0.085 |
| A6-7 | 1400 | 1000 | 4 | 0.72 | 1.47 | 0.085 |
| A6-8 | 1400 | 1150 | 4 | 0.72 | 1.47 | 0.085 |
| A6-9 | 1400 | 1250 | 4 | 0.72 | 1.47 | 0.085 |
| A6-10 | 1420 | 1000 | 4 | 0.72 | 1.47 | 0.085 |
| A6-11 | 1420 | 1150 | 4 | 0.72 | 1.47 | 0.085 |
| A6-12 | 1420 | 1250 | 4 | 0.72 | 1.47 | 0.085 |

| Number | Room-Temperature Resistivity $R_{25}$ ($\Omega$cm) | Temperature Coefficient of Resistance $\alpha$ (%/° C.) | Curie Temperature $T_C$ (° C.) | Heat-Resistant Temperature $T_L$ (° C.) | Withstand Voltage $V_0$ (V) | Normalized Withstand Voltage $V_L$ ($V_0/R_{25}$) |
|---|---|---|---|---|---|---|
| A6-1 | 22.5 | 1.77 | 216.9 | >350 | >350 | >3 |
| A6-2 | 24.2 | 1.44 | 221.0 | >350 | >350 | >3 |
| A6-3 | 25.9 | 2.36 | 192.1 | >350 | >350 | >3 |
| A6-4 | 46.4 | 6.68 | 155.2 | >350 | >350 | >3 |
| A6-5 | 38.3 | 5.91 | 158.8 | >350 | >350 | >3 |
| A6-6 | 42.0 | 6.16 | 156.6 | >350 | >350 | >3 |
| A6-7 | 68.2 | 6.95 | 151.3 | >350 | >350 | >3 |
| A6-8 | 35.3 | 5.07 | 157.9 | >350 | >350 | >3 |
| A6-9 | 59.3 | 6.53 | 149.1 | >350 | >350 | >3 |
| A6-10 | 34.8 | 4.74 | 160.2 | >350 | >350 | >3 |
| A6-11 | 65.2 | 6.78 | 149.1 | >350 | >350 | >3 |
| A6-12 | 33.4 | 4.65 | 159.6 | >350 | >350 | >3 |

Example A8

As described below, a BaTi oxide was added before the third raw material was heat-treated.

Figure 13:
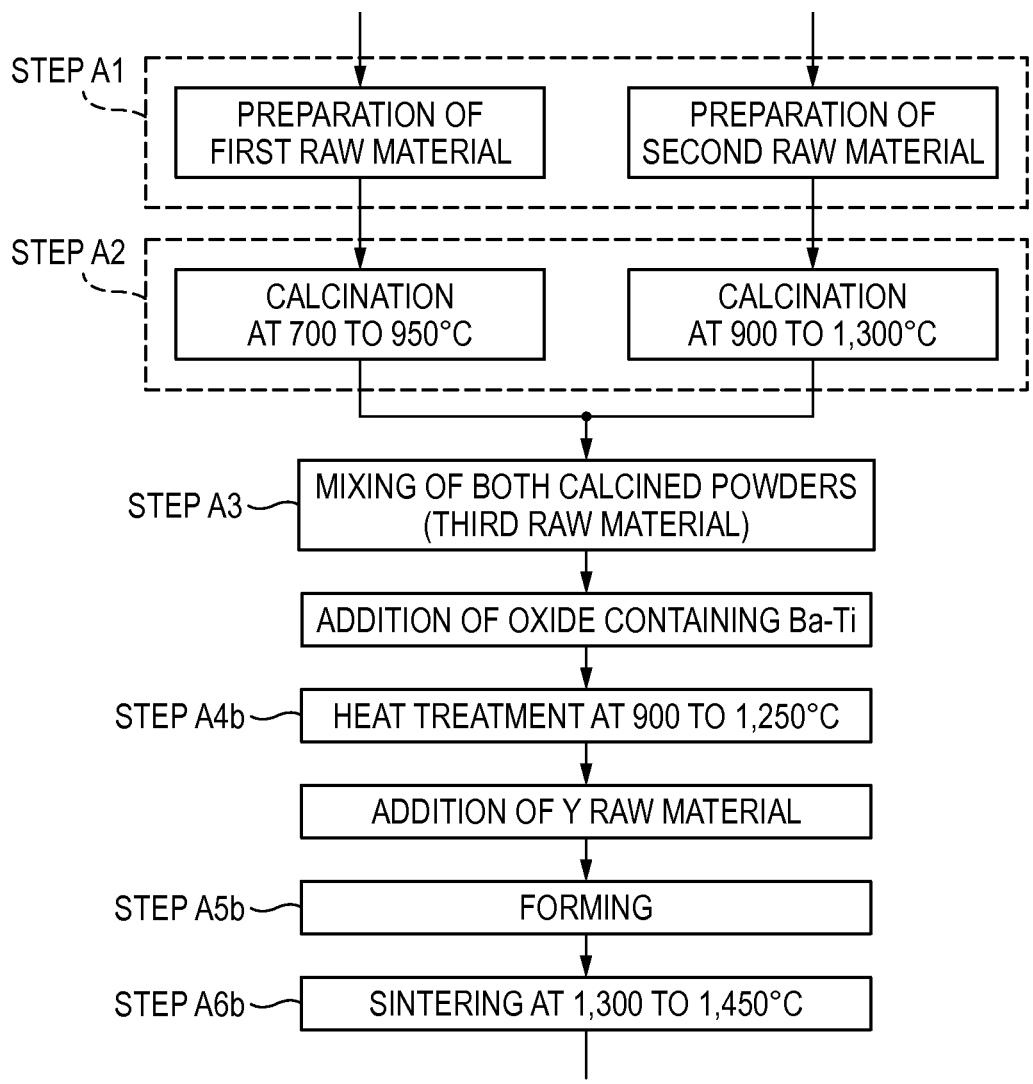
FIG. 13 is a view illustrating a preferable production method for obtaining another semiconductor ceramic composition of the present invention.

As shown in FIG. 13, a (BiA)$TiO_3$-based first raw material and a (BaR)[TiM]$O_3$-based second raw material were prepared as the raw material (Step A1). In this Example, raw material powders of $Na_2CO_3$, $Bi_2O_3$ and $TiO_2$ were prepared as the (BiA)$TiO_3$-based first raw material, combined to provide $(Bi_{0.5}Na_{0.5})TiO_3$ where the molar ratio Bi/Na of Bi and Na is 1.0, and dry mixed. Also, raw material powders of $BaCO_3$, $TiO_2$ and $La_2O_3$ were prepared as the (BaR)[TiM]$O_3$-based second raw material, combined to provide $(Ba_{0.994}La_{0.006})TiO_3$, and mixed using pure water.

The first raw material was calcined at 700° C. to 950° C., and the second raw material was calcined at 1,100° C. to 1,300° C. (Step A2). In this Example, the calcination was performed under the following conditions. The obtained first raw material was calcined at 800° C. for 2 hours in the atmosphere to prepare a (BiA)$TiO_3$-based calcined powder. Also, the second raw material was calcined at 1,100° C. for 4 hours in the atmosphere to prepare a (BaR)[TiM]$O_3$-based calcined powder.

Respective calcined raw materials were mixed to prepare a third raw material (Step A3). In this Example, the mixing was performed under the following conditions. The (BiA)$TiO_3$-based calcined powder and the (BaR)[TiM]$O_3$-based calcined powder were mixed to provide $[(Bi_{0.5}Na_{0.5})_{0.085}(Ba_{0.994}La_{0.006})_{0.915}]TiO_3$. The resulting raw material was mixed and pulverized in a pot mill by using pure water as the medium until the average particle diameter became from 0.8 μm to 3.0 μm, and then dried to prepare a third raw material.

To this third raw material, an oxide containing Ba and Ti, which becomes a liquid phase at 1,300° C. to 1,450° C., was added. In this Example, the addition was performed under the following conditions. A mixture was produced by adding $Ba_6Ti_{17}O_{40}$ in an amount of 0.70 mol % based on the entire raw material of the semiconductor ceramic composition.

The resulting third raw material was heat-treated at 900° C. to 1,250° C. (Step A4b). In this Example, the heat treatment was performed under the following conditions. The mixture of the third raw material and $Ba_6Ti_{17}O_{40}$ was heat-treated at 1,150° C. for 4 hours in the atmosphere so as to react the (BiA)$TiO_3$-based calcined powder and the (BaR)[TiM]$O_3$-based calcined powder.

Subsequently, $Y_2O_3$ was added each in an amount of 1.50 mol % based on the entire raw material of the semiconductor ceramic composition.

Thereafter, the mixture was formed (Step A5b). In this Example, PVA was added and mixed in the mixture of third raw material, BaTi oxide and $Y_2O_3$, and the resulting material was granulated. The granulated powder obtained was formed using a monoaxial pressing apparatus and thereby formed into a plate of 15 mm×15 mm×3.4 mm.

Furthermore, the formed powder was sintered in the temperature region of 1,300° C. to 1,450° C. (Step A6b). In this Example, the sintering was performed under the following conditions. The compact was subjected to binder removal at 700° C. and then sintered by holding it at 1,420° C. for 4 hours in nitrogen under the condition of an oxygen concentration of 70 ppm to obtain a sintered body.

The sintered body obtained was processed into a plate of 10 mm×10 mm×1.0 mm to produce a test piece, an ohmic electrode was coated thereon, a cover electrode was further coated, and drying at 180° C. and then baking at 600° C. for a holding time of 10 minutes were performed to form electrodes.

The measured results of room-temperature resistivity $R_{25}$, temperature coefficient α of resistance, Curie temperature $T_C$, change over time, heat-resistant temperature $T_L$, withstand voltage $V_0$ and normalized withstand voltage $V_L$ are shown in Table 7. The heat-resistant temperature $T_L$ was 480° C., the withstand voltage $V_0$ was 420° C., and the normalized withstand voltage $V_L$ was 4.0. Thus, a semiconductor ceramic composition having a high normalized withstand voltage was obtained.

Figure 14:
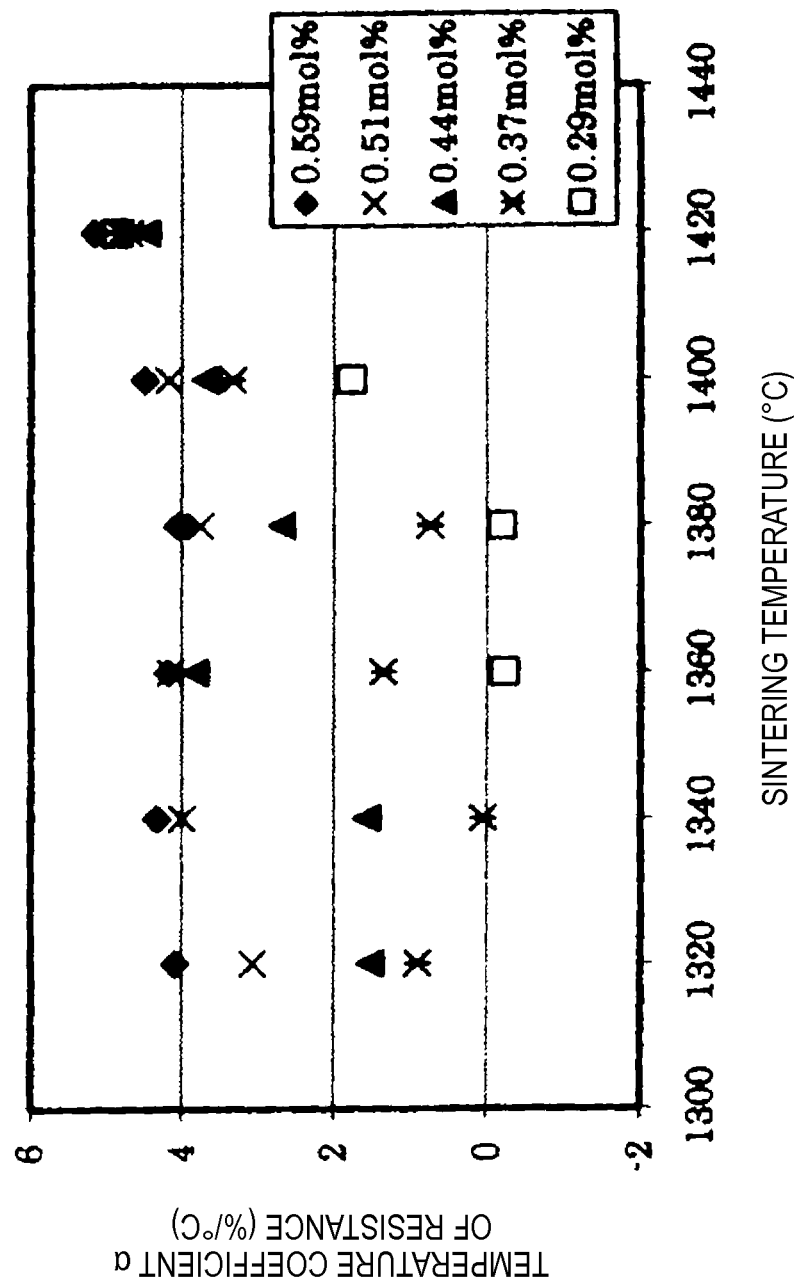
FIG. 14 is a view showing the relationship between the sintering temperature and the temperature coefficient α of resistance.

Also, the same experiment as in Example C1 described later was performed by changing the amount of BaTi oxide, as a result, evaluation results having the same tendency as in FIG. 14 were obtained. Incidentally, FIG. 14 is described in detail later.

TABLE 7

| Number | Sintering Temperature (° C.) | Sintering Time (hr) | $Ba_6Ti_{17}O_{40}$ (mol %) | $Y_2O_3$ (mol %) | Amount of (BiNa)TiO$_3$ x | Room-Temperature Resistivity $R_{25}$ (Ωcm) |
|---|---|---|---|---|---|---|
| A7-1 | 1420 | 4 | 0.70 | 1.50 | 0.085 | 105.3 |

| Number | Temperature Coefficient α of Resistance (%/° C.) | Curie Temperature $T_C$ (° C.) | Heat-Resistant Temperature $T_L$ (° C.) | Withstand Voltage $V_0$ (V) | Normalized Withstand Voltage $V_L$ ($V_0/R_{25}$) |
|---|---|---|---|---|---|
| A7-1 | 4.69 | 152.4 | 480 | 420 | 4.0 |

Figure 15:
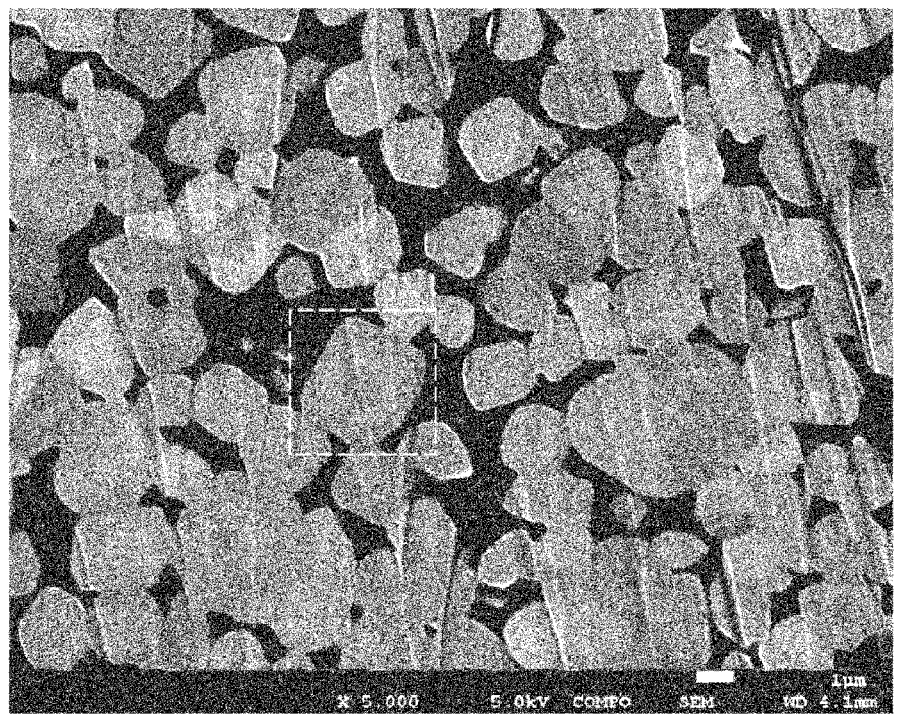
FIG. 15 is a still another structure observation photograph of a crystal grain in the semiconductor ceramic composition of the present invention.
Figure 16:
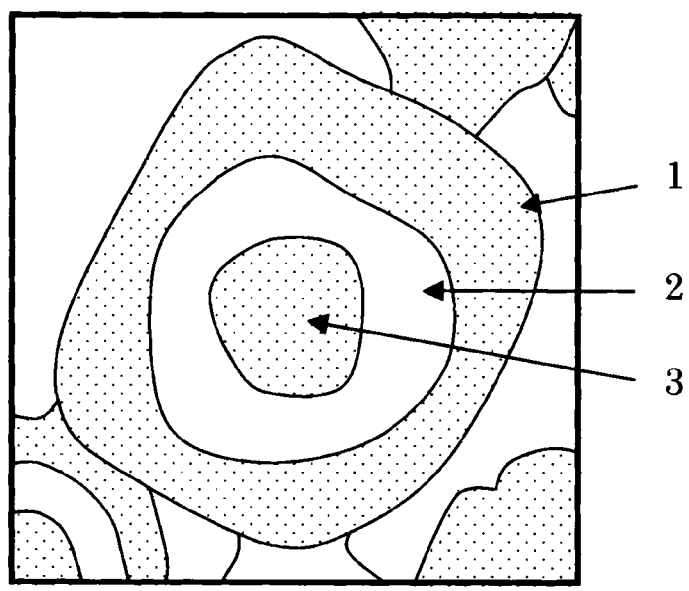
FIG. 16 is a schematic view of FIG. 15.

FIG. 15 is a cross-sectional SEM photograph of the semiconductor ceramic composition of Example A8. FIG. 16 is a schematic view of the crystal grain surrounded by a white frame shown in FIG. 15.

In the photographed crystal grain, as shown in the schematic view of FIG. 15, the portion between the outer shell portion 1 and the center portion 3 is colored lighter than the out shell portion or center portion, and a change in contrasting density from the center toward the outer side of the crystal grain could be confirmed. The Bi concentration was measured, as a result, the middle portion 2 having a highest Bi concentration within the crystal grain was confirmed to have a concentration of 3 times or more greater than that of the center portion 3, and the outer shell portion was confirmed to have a concentration of 1.5 times or more greater than the Bi concentration in the center portion.

The compositional formulation of the crystal grain was examined, as a result, the composition formula was represented by $[(BiA)_x(Ba_{1-y}R_y)_{1-x}][Ti_{1-z}M_z]O_3$ (wherein A is at least one kind of Na, Li and K, R is at least one kind of rare earth elements including Y, and M is at least one kind of Nb, Ta and Sb) in which x, y and z satisfied $0<x\leq0.2$, $0\leq y\leq0.02$ and $0\leq z\leq0.01$ (provided that y+z>0).

Also, a secondary phase containing Y and a secondary phase not containing Y were present in addition to the crystal grain, and in the secondary phase containing Y, Y amount in a portion distant from the crystal grain was larger than Y amount in a portion adjacent to the crystal grain.

Furthermore, the crystal grain had a higher Y concentration in the outer shell portion than in the center portion within the crystal grain.

Figure 18:
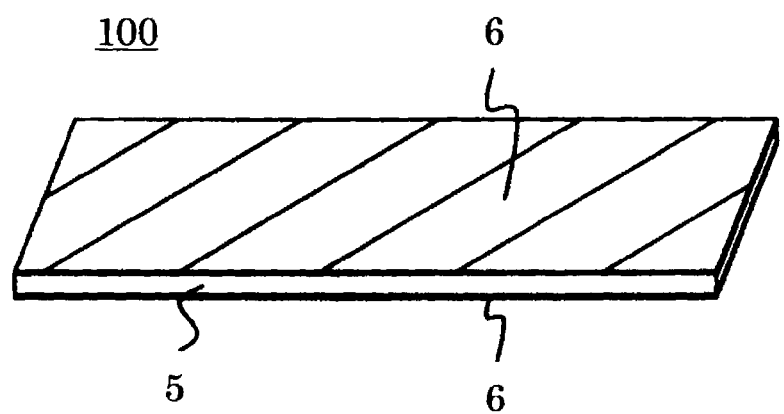
FIG. 18 is a sketch of the PTC element.

Incidentally, for example, as shown in FIG. 18, electrodes 6 serving as a positive electrode and a negative electrode are formed on the surface of a PTC body 5 obtained by processing the semiconductor ceramic composition into a predetermined shape, whereby the semiconductor ceramic composition is used as a PTC element 100. The conventional lead-free semiconductor ceramic composition is sometimes in a state where the temperature coefficient of resistance is large only near the electrode formed on the surface and a small temperature coefficient of resistance is exhibited inside the semiconductor ceramic composition.

In the case of a semiconductor ceramic composition having a large temperature coefficient of resistance only near the electrode, when a voltage is applied to the electrode of the PTC element, the voltage is concentrated only on the Schottky barrier present near the electrode. Application of a voltage to a narrow region readily allows for occurrence of exceeding the withstand voltage $V_0$ shown in FIG. 2. If the voltage applied exceeds the withstand voltage $V_0$, the change over time is considered to increase at a rate by far higher than the ordinary change with aging.

In order to solve this problem, it is necessary to obtain a semiconductor ceramic composition exhibiting a large temperature coefficient of resistance also inside the semiconductor ceramic composition, form a Schottky barrier throughout the material, disperse the voltage across the entirety in the thickness direction of the PTC element, and keep small the change over time.

Patent Document 3 describes a semiconductor ceramic composition using a Y raw material and discloses, as the production method, a production process of preparing $BaCO_3$, $Na_2CO_3$, $Bi_2O_3$, $TiO_2$ and $Y_2O_3$ working out to prime raw materials for the main component, mixing the powders, and calcining the mixed powder. However, the effect of improving the change over time is not studied.

According to the semiconductor ceramic composition of the present invention, as demonstrated in Examples B1 to B3 below, it can be expected that the change over time is reduced.

Example B1

Figure 19:
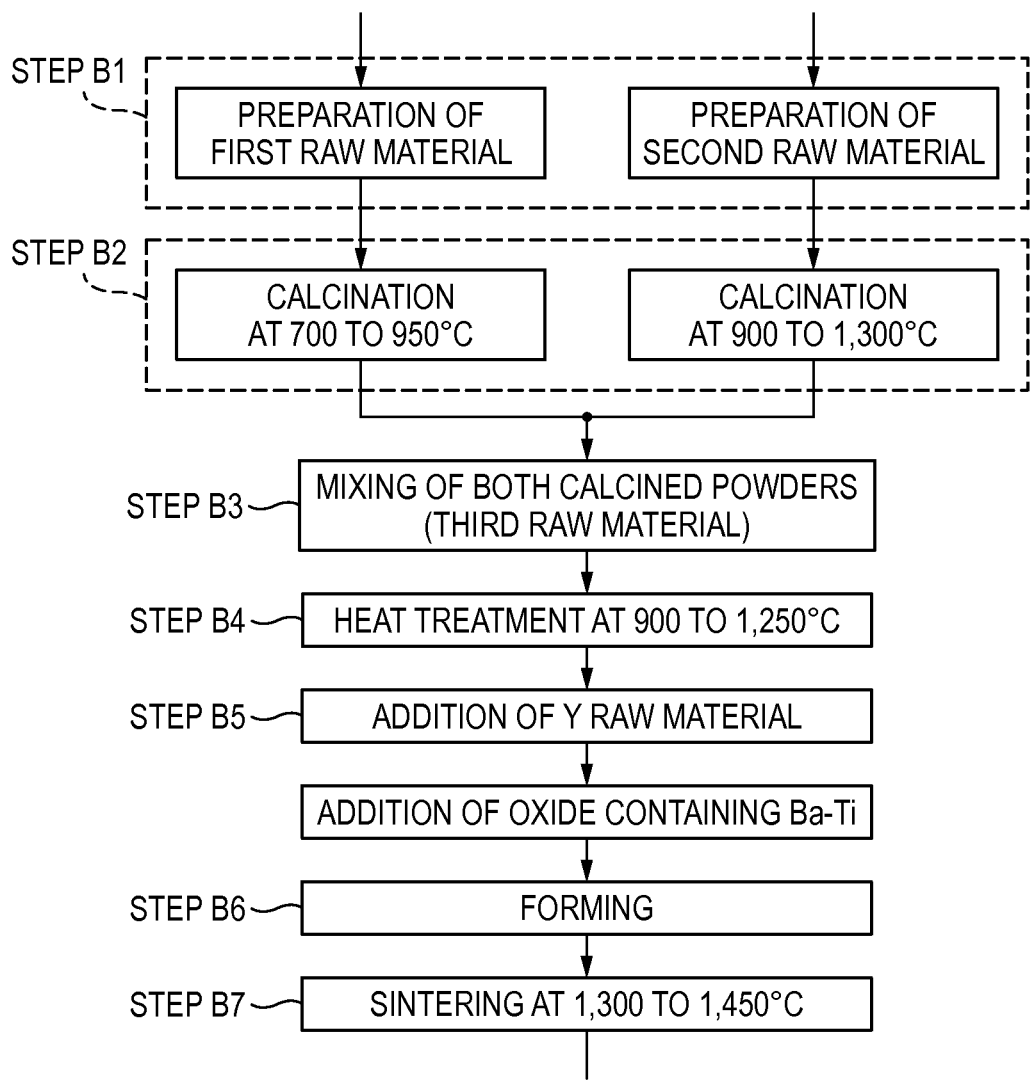
FIG. 19 is an another view for explaining the production method of the semiconductor ceramic composition of the present invention.

As shown in FIG. 19, a (BiA)TiO$_3$-based first raw material and a (BaR)[TiM]O$_3$-based second raw material were prepared as the raw material (Step B1). In this Example, raw material powders of $Na_2CO_3$, $Bi_2O_3$ and $TiO_2$ were prepared as the (BiA)TiO$_3$-based first raw material, combined to provide (Bi$_{0.5}$Na$_{0.5}$)TiO$_3$ where the molar ratio Bi/Na of Bi and Na is 1.0, and dry mixed. Also, raw material powders of $BaCO_3$, $TiO_2$ and $La_2O_3$ were prepared as the (BaR)[TiM]O$_3$-based second raw material, combined to provide (Ba$_{0.994}$La$_{0.006}$)TiO$_3$, and mixed using pure water.

The first raw material was calcined at 700° C. to 950° C., and the second raw material was calcined at 900° C. to 1,300°

C. (Step B2). In this Example, the obtained first raw material was calcined at 800° C. for 2 hours in the atmosphere to prepare a (BiA)TiO$_3$-based calcined powder. Also, the second raw material was calcined at 1,200° C. for 4 hours in the atmosphere to prepare a (BaR)[TiM]O$_3$-based calcined powder.

Respective calcined materials were mixed to prepare a third raw material (Step B3). In this Example, the mixing was performed under the following conditions. The (BiA)TiO$_3$-based calcined powder and the (BaR)[TiM]O$_3$-based calcined powder were mixed to provide [(Bi$_{0.5}$Na$_{0.5}$)$_{0.085}$(Ba$_{0.994}$La$_{0.006}$)$_{0.915}$]TiO$_3$. The material was mixed and pulverized in a pot mill by using pure water as the medium until the average particle diameter became from 2.0 μm to 3.0 μm, and then dried to prepare a third raw material.

The third raw material was heat-treated at 900° C. to 1,250° C. (Step B4). In this Example, the heat treatment was performed under the following conditions. The third raw material was heat-treated at 1,150° C. for 4 hours in the atmosphere so as to react the (BiA)TiO$_3$-based calcined powder and the (BaR)[TiM]O$_3$-based calcined powder. The heat treatment temperature was set to a temperature at which respective diffraction lines of the (BiA)TiO$_3$-based calcined powder and the (BaR)[TiM]O$_3$-based calcined powder become one line in the X-ray diffraction.

Subsequently, a Y raw material was added to the heat-treated raw material (Step B5). In this Example, the addition was performed under the following conditions. Y$_2$O$_3$ was added in an amount of 0.4 mol % based on the entire raw material of the semiconductor ceramic composition.

Also, a BaTi oxide represented by Ba$_6$Ti$_{17}$O$_{40}$ was added in an amount of 0.29 mol % based on the entire raw material of the semiconductor ceramic composition.

Thereafter, forming was performed (Step B5). In this Example, the granulated powder obtained was formed using a monoaxial pressing apparatus and subjected to binder removal at 700° C.

Furthermore, the formed powder was sintered (Step B6). In this Example, the sintering was performed under the following conditions. The formed powder was sintered by holding it at 1,380° C. for 4 hours in nitrogen under the condition of an oxygen concentration of 70 ppm to obtain a sintered body.

The sintered body obtained was processed into a plate of 10 mm×10 mm×1.0 mm to produce a test piece, an ohmic electrode was coated thereon, a cover electrode was further coated, and drying at 180° C. and then baking at 600° C. for a holding time of 10 minutes were performed to form electrodes.

Figure 20:
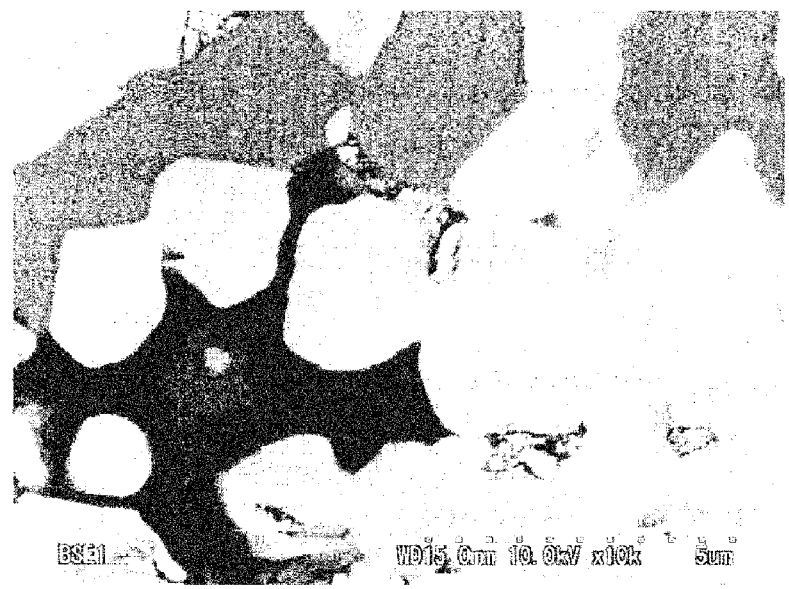
FIG. 20 is a structure observation photograph of the semiconductor ceramic composition of Comparative Example.
Figure 21:
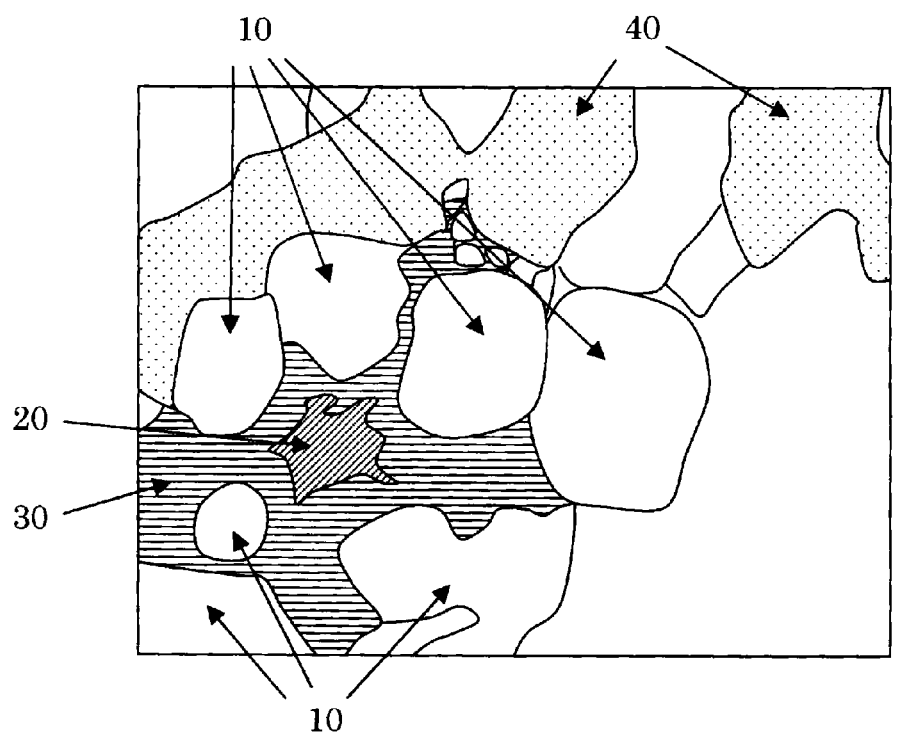
FIG. 21 is a schematic view of FIG. 20.

FIG. 20 is an SEM photograph showing the secondary phase containing Y, and FIG. 21 is a schematic view thereof.

In FIG. 21, 10 is a crystal grain having a composition formula of [(Bi$_{0.5}$Na$_{0.5}$)$_{0.085}$(Ba$_{0.994}$La$_{0.006}$)$_{0.915}$]TiO$_3$, 20 and 30 are a secondary phase containing Y, 20 is a portion distant from the crystal grain, 30 is a portion adjacent to the crystal grain, and 40 is a secondary phase not containing Y. In this Example, the compositional formulation of the secondary phase 40 not containing Y was BaTi$_2$O$_5$.

The compositional analysis results (the ratio of each oxide assuming that the total of NaO$_{1/2}$, BiO$_{3/2}$, BaO, LaO$_{3/2}$, TiO$_2$ and YO$_{3/2}$ is 100 mol %) of the Y-containing secondary phase in the portion 20 distant from the crystal grain and in the portion 30 adjacent to the crystal grain are shown in Table 8.

TABLE 8

| Secondary Phase Containing Y | NaO$_{1/2}$ | BiO$_{3/2}$ | BaO | LaO$_{3/2}$ | TiO$_2$ | YO$_{3/2}$ |
|---|---|---|---|---|---|---|
| | | | | | | (mol %) |
| Portion 20 distant from crystal grain | 2.1 | 0.6 | — | — | 46.7 | 50.6 |
| Portion 30 adjacent to crystal grain | 8.4 | 1 | 23.8 | 0.3 | 45.8 | 20.7 |

The compositional formulation differs between the portion 30 adjacent to the crystal grain and the portion 20 distant from the crystal grain, and the Y amount is larger in the portion 20 distant from the crystal grain than in the portion 30 adjacent to the crystal grain. The Y amount in the portion 20 distant from the crystal grain is 35 mol % or more in terms of oxide, and in this Example, the Y amount was 50.6 mol %. Also, the Y amount in the portion 30 adjacent to the crystal grain is from 5 mol % to less than 35 mol % in terms of oxide, and in this Example, the Y amount was 20.7 mol %.

In the semiconductor ceramic composition of the present invention, the Na amount in the portion distant from the crystal grain is less than 5 mol % in terms of oxide, and in this Example, the amount was 2.1 mol %. On the other hand, the Na amount in the portion adjacent to the crystal grain is 5 mol % or more, and in this Example, the amount was 8.4 mol %.

Furthermore, although this does not apply to all Y-containing secondary phases, over half thereof had a tendency that the Bi amount is larger in the portion 30 adjacent to the crystal grain than in the portion 20 distant from the crystal grain. The amounts of Ba and La are also likely to be larger in the portion 30 adjacent to the crystal grain than in the portion 20 distant from the crystal grain.

Figure 22:
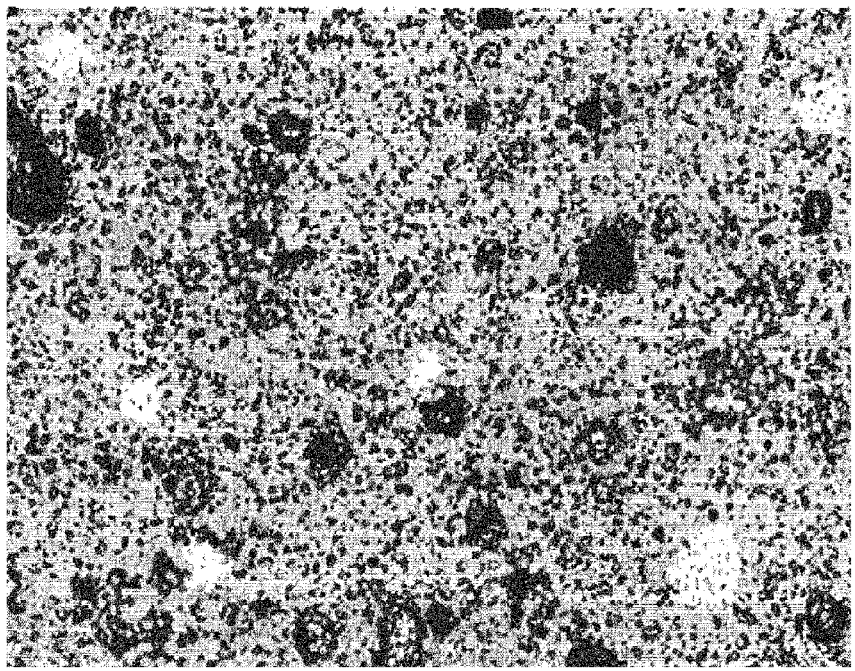
FIG. 22 is an another structure observation photograph of the semiconductor ceramic composition of the present invention.
Figure 23:
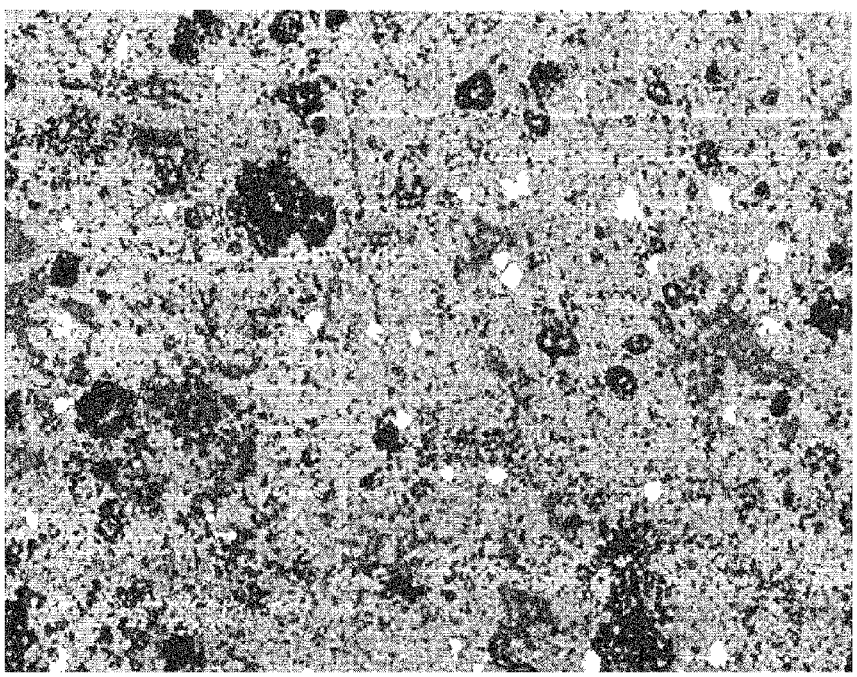
FIG. 23 is a still another structure observation photograph of the semiconductor ceramic composition of the present invention.

FIGS. 22 and 23 are cross-sectional photographs for measuring the area ratio of the Y-containing secondary phase in the semiconductor ceramic composition of the present invention, where the portion of Y-containing secondary phase is modified to white. FIG. 22 is a semiconductor ceramic composition produced in the same manner as in Example B1 except for sintering the formed powder by holding it at 1,440° C. for 4 hours, and FIG. 23 is a semiconductor ceramic composition produced in the same manner as in Example B1 except for sintering the formed powder by holding it at 1,360° C. for 4 hours.

The measured results of the area ratio of the Y-containing secondary phase (white portion) are shown in Table 9.

A commercially available image analysis software was used for the measurement of area ratio. The portion of Y-containing secondary phase in the SEM observation photograph was modified to white and assuming that the entire surface (the sum total of areas of crystal grain, BaTi$_2$O$_5$ phase, Y-containing secondary phase and void) is 100%, the area ratio of the white portion was determined by the image analysis software.

In both semiconductor ceramic compositions, a high value of 1.0% or more was detected for the area ratio of the Y-containing secondary phase.

TABLE 9

| | Sintering Temperature | Area Ratio of Crystal Grain | Area Ratio of BaTi$_2$O$_5$ | Y-Containing Secondary Phase | Void |
|---|---|---|---|---|---|
| FIG. 4 | 1440° C. | 74.41 | 4.81 | 1.35 | bal |
| FIG. 5 | 1360° C. | 74.41 | 6.97 | 1.08 | bal |

Figure 24:
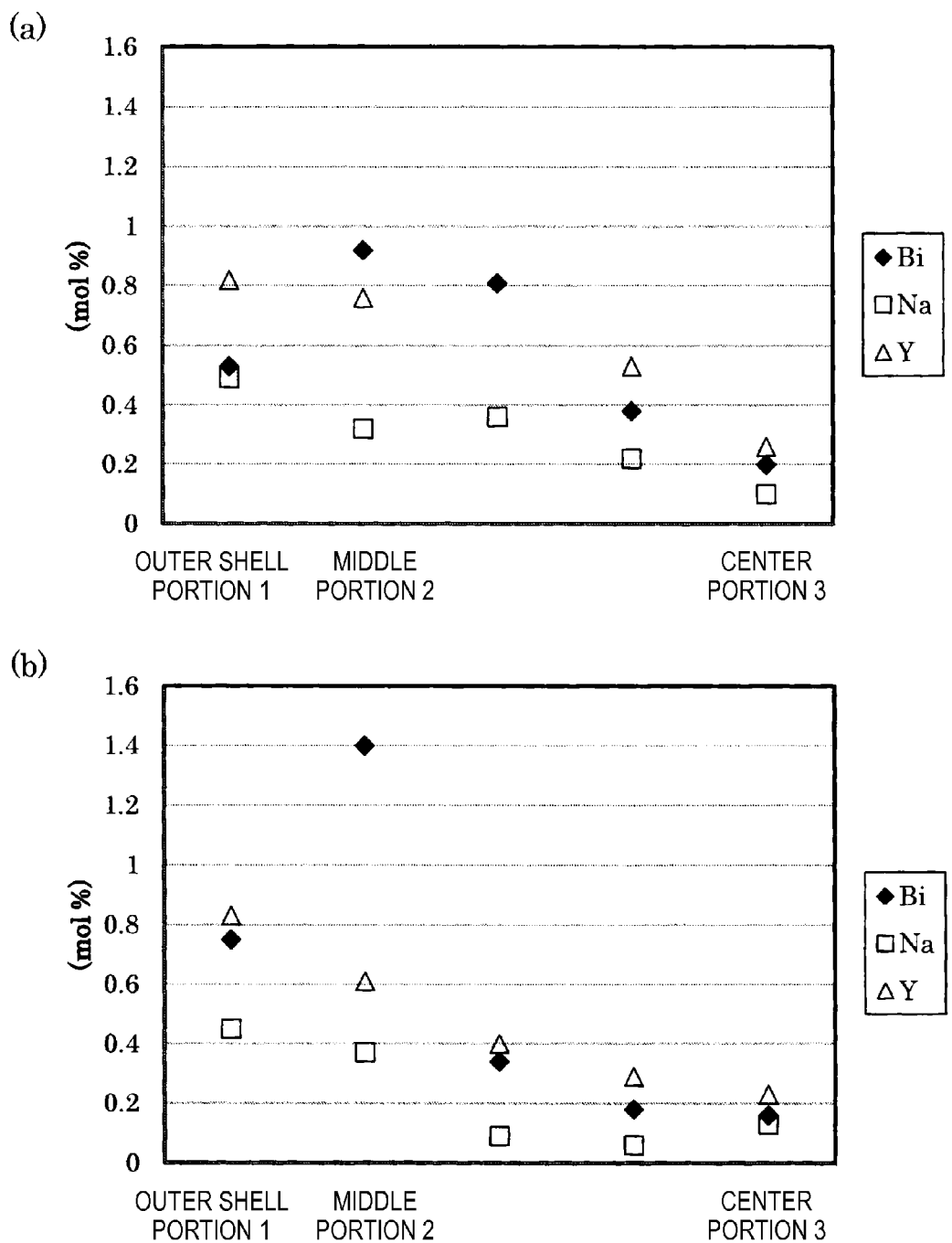
FIG. 24 is a view showing the concentration distribution of Bi, Na and Y in a crystal grain of the semiconductor ceramic composition of the present invention.

Prescribed two crystals of the obtained semiconductor ceramic composition were arbitrarily selected, and the compositional analysis was performed at respective 5 positions created by dividing the distance between the outer shell portion and the center portion into 4 equal parts. FIG. 24 shows the results.

The Bi, Na and Y concentrations were measured using an atomic resolution analysis-electron microscope (EDX: manufactured by JEOL), an energy dispersion X-ray spectroscopy (EELS: manufactured by JEOL), and an electron energy loss spectroscopy (EELS: manufactured by Gatan) by setting the accelerating voltage to 200 kV.

The crystal 10 of the obtained semiconductor ceramic composition has a crystal structure in which, as shown in the schematic view of FIG. 4, a nearly annular middle portion 2 (a white annular portion within crystal) having a highest Bi concentration, an outer shell portion 1 (a portion with dark color outside the region 2) having a Bi concentration lower than that in the middle portion 2, and a center portion 3 (a portion with dark color inside the region 2) having a Bi concentration lower than that in the middle portion 2 are present inside the crystal grain 10.

The Bi concentration in the middle portion 2 is higher than the Bi concentrations in the center portion 3 and the outer shell portion 1. The Bi concentration in the middle portion 2 is 0.4 mol % or more. The Bi concentrations in the center portion 3 and the outer shell portion 1 sometimes exceed 0.4 mol %. In this case, the Bi concentration in the middle portion 2 is higher, and the Bi concentration in the center portion 3 is lower than the Bi concentration in the outer shell portion 1.

Furthermore, in the crystal grain 10, as measured in FIG. 24, the middle portion 2 has a higher Y concentration than the center portion 3 shown in FIG. 4, and the Y concentration in the middle portion 2 is 1.2 times or more greater than that of the center portion 3.

In the obtained semiconductor ceramic composition, 70% or more of crystal grains based on the total number of crystals had the above-described Bi concentration distribution and Y concentration distribution.

The compositional formulation of the crystal grain was examined, as a result, the composition formula was represented by $[(BiA)_x(Ba_{1-y}R_y)_{1-x}][Ti_{1-z}M_z]O_3$ (wherein A is at least one kind of Na, Li and K, R is at least one kind of rare earth elements including Y, and M is at least one kind of Nb, Ta and Sb) in which x, y and z satisfied $0<x\leq0.2$, $0\leq y\leq0.02$ and $0\leq z\leq0.01$ (provided that $y+z>0$).

Also, the crystal grain had a higher Y concentration in the outer shell portion than in the center portion within the crystal grain.

Example B2

The experiment was performed by changing the amount added of $Y_2O_3$.

(Step B1) to (Step B4) were performed in the same manner as in Example B1.

Subsequently, a Y raw material was added to the heat-treated material (Step B5). In this Example, the addition was performed under the following conditions. $Y_2O_3$ was added by changing the amount in the range of 0 to 2.47 mol % based on the entire raw material of the semiconductor ceramic composition.

Also, a BaTi oxide represented by $Ba_6Ti_{17}O_{40}$ was added in an amount of 0.29 mol % based on the entire raw material of the semiconductor ceramic composition.

Thereafter, forming was performed (Step B6). In this Example, the forming was performed under the following conditions. PVA was added and mixed, the resulting powder was granulated and formed using a monoaxial pressing apparatus, and the formed powder was subjected to binder removal at 700° C.

Furthermore, the formed powder was sintered (Step B7). In this Example, the sintering was performed under the following conditions. The formed powder was sintered by holding it at 1,360° C. and 1,440° C. for 4 hours in nitrogen under the condition of an oxygen concentration of 70 ppm to obtain a sintered body.

The measured results of room-temperature resistivity $R_{25}$, temperature coefficient α of resistance, Curie temperature $T_C$, change over time, heat-resistant temperature $T_L$, withstand voltage $V_0$ and normalized withstand voltage $V_L$ are shown in Table 10. Also, as the degree of improvement in the change over time, a value represented by the following Math. 1 is shown in Table 10.

Degree of improvement (%) in change over time=[1−(change over time)/(change over time when $Y_2O_3$ is 0 mol %)]×100 [Math. 1]

TABLE 10

| Number | Sintering Temperature (° C.) | $Ba_6Ti_{17}O_{40}$ (mol %) | $Y_2O_3$ (mol %) | Amount of $(BiNa)TiO_3$ x | Room-Temperature Resistivity $R_{25}$ (Ωcm) | Temperature Coefficient of Resistance α (%/° C.) |
|---|---|---|---|---|---|---|
| *B4-1 | 1360 | 0.29 | 0 | 0.085 | 1140.6 | 8.76 |
| B4-2 | 1360 | 0.29 | 0.02 | 0.085 | 1060.0 | 7.92 |
| B4-3 | 1360 | 0.29 | 0.08 | 0.085 | 1062.6 | 7.63 |
| B4-4 | 1360 | 0.29 | 0.15 | 0.085 | 816.5 | 8.60 |
| B4-5 | 1360 | 0.29 | 0.55 | 0.085 | 62.2 | 4.35 |
| B4-6 | 1400 | 0.29 | 0.99 | 0.085 | 43.7 | 5.15 |
| B4-7 | 1440 | 0.29 | 0.99 | 0.085 | 46.0 | 5.16 |
| B4-8 | 1440 | 0.29 | 1.48 | 0.085 | 39.6 | 4.57 |
| B4-9 | 1440 | 0.29 | 1.97 | 0.085 | 30.7 | 3.90 |
| B4-10 | 1440 | 0.29 | 2.47 | 0.085 | 27.1 | 3.62 |

| Number | Curie Temperature $T_C$ (° C.) | Change Over Time (%) | Degree of Improvement in Change Over Time (%) | Heat-Resistant Temperature $T_L$ (° C.) | Withstand Voltage $V_0$ (V) | Normalized Withstand Voltage $V_L$ ($V_0/R_{25}$) |
|---|---|---|---|---|---|---|
| *B4-1 | 148.8 | 410.2 | 0.0 | 420 | 715 | 0.6 |
| B4-2 | 146.1 | 382.5 | 6.8 | 404 | 423 | 0.4 |
| B4-3 | 143.6 | 378.7 | 7.7 | 441 | 433 | 0.4 |
| B4-4 | 139.8 | 353.5 | 13.8 | 417 | 460 | 0.6 |
| B4-5 | 159.0 | 349.1 | 14.9 | 400 | 444 | 7.1 |

TABLE 10-continued

| | | | | | | |
|---|---|---|---|---|---|---|
| B4-6 | 157.8 | 22.5 | 94.5 | 487 | 454 | 10.4 |
| B4-7 | 154.8 | 7.3 | 98.2 | 469 | 454 | 9.9 |
| B4-8 | 160.0 | 2.1 | 99.5 | 458 | 460 | 11.6 |
| B4-9 | 167.7 | 1.6 | 99.6 | 465 | 470 | 15.3 |
| B4-10 | 168.6 | 1.1 | 99.7 | 491 | 465 | 17.2 |

It is understood from Table 10 that as the amount of $Y_2O_3$ added is increased, the change over time is reduced. Also, it is seen that when the amount of $Y_2O_3$ is 0.55 mol % or more, the room-temperature resistivity $R_{25}$ becomes 100 Ωcm or less.

In Samples B4-2 to B4-10, a structure where a crystal grain not containing Y, a secondary phase containing Y and a secondary phase not containing Y are present and in the secondary phase containing Y, the structure in which Y amount in a portion distant from the crystal grain was larger than Y amount in a portion adjacent to the crystal grain, was observed.

The semiconductor ceramic composition obtained in this Example has a crystal grain in the inside thereof. The crystal grain has a region between a center portion and an outer shell portion within the crystal grain, in which when Bi concentration is measured in a radial direction within the crystal grain, the Bi concentration in the region is higher than both Bi concentration in the center portion and Bi concentration in the outer shell portion. The maximum value of the Bi concentration is 0.4 mol % or more. The middle portion has a concentration of 3 times or more greater than the Bi concentration in the center portion. Also, the outer shell portion has a concentration of 1.5 times or more greater than the Bi concentration in the center portion.

The compositional formulation of the crystal grain was examined, as a result, the composition formula was represented by $[(BiA)_x(Ba_{1-y}R_y)_{1-x}][Ti_{1-z}M_z]O_3$ (wherein A is at least one kind of Na, Li and K, R is at least one kind of rare earth elements including Y, and M is at least one kind of Nb, Ta and Sb) in which x, y and z satisfied $0<x\leq0.2$, $0\leq y\leq0.02$ and $0\leq z\leq0.01$ (provided that y+z>0).

Also, the crystal grain had a higher Y concentration in the outer shell portion than in the center portion within the crystal grain.

Figure 25:
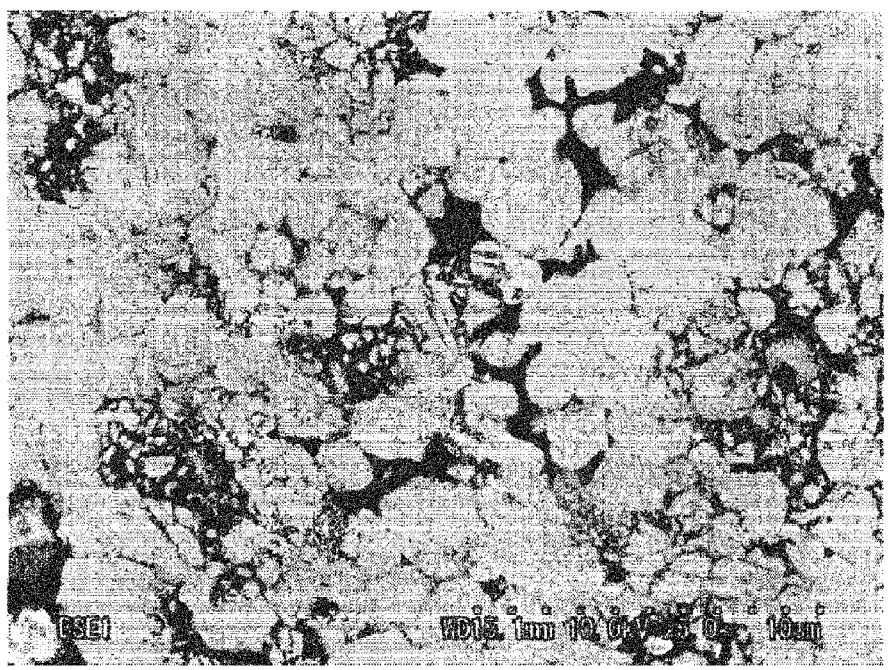
FIG. 25 is an SEM photograph of the semiconductor ceramic composition of Comparative Example where a Y raw material is not added.

FIG. 25 is an SEM photograph of the semiconductor ceramic composition of Comparative Sample B4-1 where a Y raw material is not added.

A darkly displayed portion is seen among crystals. This portion is a void or a secondary phase not containing Y shown in Table 11, and a secondary phase containing Y could not be observed.

TABLE 11

| | | | | | | (mol %) |
|---|---|---|---|---|---|---|
| | $NaO_{1/2}$ | $BiO_{3/2}$ | BaO | $LaO_{3/2}$ | $TiO_2$ | $YO_{3/2}$ |
| Secondary phase not containing Y | 1.5 | — | 26.5 | — | 72 | — |

Comparative Example B1

The effect of the amount added of the Y raw material on the change over time in the production method not involving a heat treatment was examined below.

In the production method of Comparative Example A1 shown in FIG. 5, the steps of Step A1 to Step A6' were performed in the same manner as in the production method of FIG. 5 except that in the step of adding a Y raw material to the third raw material, $Y_2O_3$ was added in an amount of 0 mol % or 0.55 mol % based on the entire raw material of the semiconductor ceramic composition.

The measured results of room-temperature resistivity $R_{25}$, temperature coefficient α of resistance, Curie temperature $T_C$, change over time, degree of improvement in change over time, heat-resistant temperature $T_L$, withstand voltage $V_0$ and normalized withstand voltage $V_L$ are shown in Table 12.

TABLE 12

| Number | Sintering Temperature (° C.) | $Ba_6Ti_{17}O_{40}$ (mol %) | $Y_2O_3$ (mol %) | Amount of (BiNa)$TiO_3$ x | Room-Temperature Resistivity $R_{25}$ (Ωcm) | Temperature Coefficient of Resistance α (%/° C.) |
|---|---|---|---|---|---|---|
| *B6-1 | 1380 | 0.29 | 0 | 0.085 | 1069.9 | 8.22 |
| *B6-2 | 1380 | 0.29 | 0.55 | 0.085 | 310.6 | 8.04 |

| Number | Curie Temperature $T_C$ (° C.) | Change Over Time (%) | Degree of Improvement in Change Over Time (%) | Heat-Resistant Temperature $T_L$ (° C.) | Withstand Voltage $V_0$ (V) | Normalized Withstand Voltage $V_L$ ($V_0/R_{25}$) |
|---|---|---|---|---|---|---|
| *B6-1 | 161.1 | 402.2 | 0.0 | 411 | 732 | 0.7 |
| *B6-2 | 155.5 | 378.7 | 5.8 | 404 | 578 | 1.9 |

In the production method of Comparative Example not involving a heat treatment, relative to Sample B6-1 where $Y_2O_3$ was not added, the degree of improvement in the change over time is less than 10% in Sample B6-2 where $Y_2O_3$ was added in an amount of 0.55 mol %. Also, the Bi concentration in the outer shell portion was high when the Bi concentration was measured in the radial direction within the crystal grain, and a crystal grain as in the present invention (a crystal grain having a middle portion which is a region between a center portion and an outer shell portion within the crystal grain, and in which the Bi concentration in the region is higher than both Bi concentration in the center portion and Bi concentration in the outer shell portion) could not be observed.

On the other hand, in the production method of the present invention involving a heat treatment, relative to Sample B4-1 where $Y_2O_3$ was not added, the degree of improvement in the change over time was 14.9% in Sample B4-5 where $Y_2O_3$ was added in an amount of 0.55 mol %, and it is understood that the effect of reducing the change over time is great.

Example B3

The same effect of reducing the change over time was similarly obtained even when a rare earth element R or an M element (Nb, Ta, Sb), other than La, was used as the semiconducting element.

Incidentally, the characteristics of the above-described semiconductor ceramic composition vary depending on the sintering density. In order to stably obtain the characteristics of the semiconductor ceramic composition, respective compacts disposed at different positions in a furnace are preferably sintered at a uniform temperature. However, because of the type or complicated structure of the furnace, the temperature inside the furnace can be hardly made uniform, and some compacts may fail in achieving a temperature rise to the desired sintering temperature. As a result, the obtained semiconductor ceramic composition has a problem that the temperature coefficient $\alpha$ of resistance is likely to change.

To solve this problem, in the production method of the semiconductor ceramic composition of the present invention, a lead-free perovskite semiconductor ceramic composition can be obtained with stable characteristics by preventing reduction in the temperature coefficient $\alpha$ of resistance.

Example C1

First, the effect of the amount added of a BaTi oxide on the relationship between the sintering temperature and the temperature coefficient $\alpha$ of resistance was examined.

Figure 26:
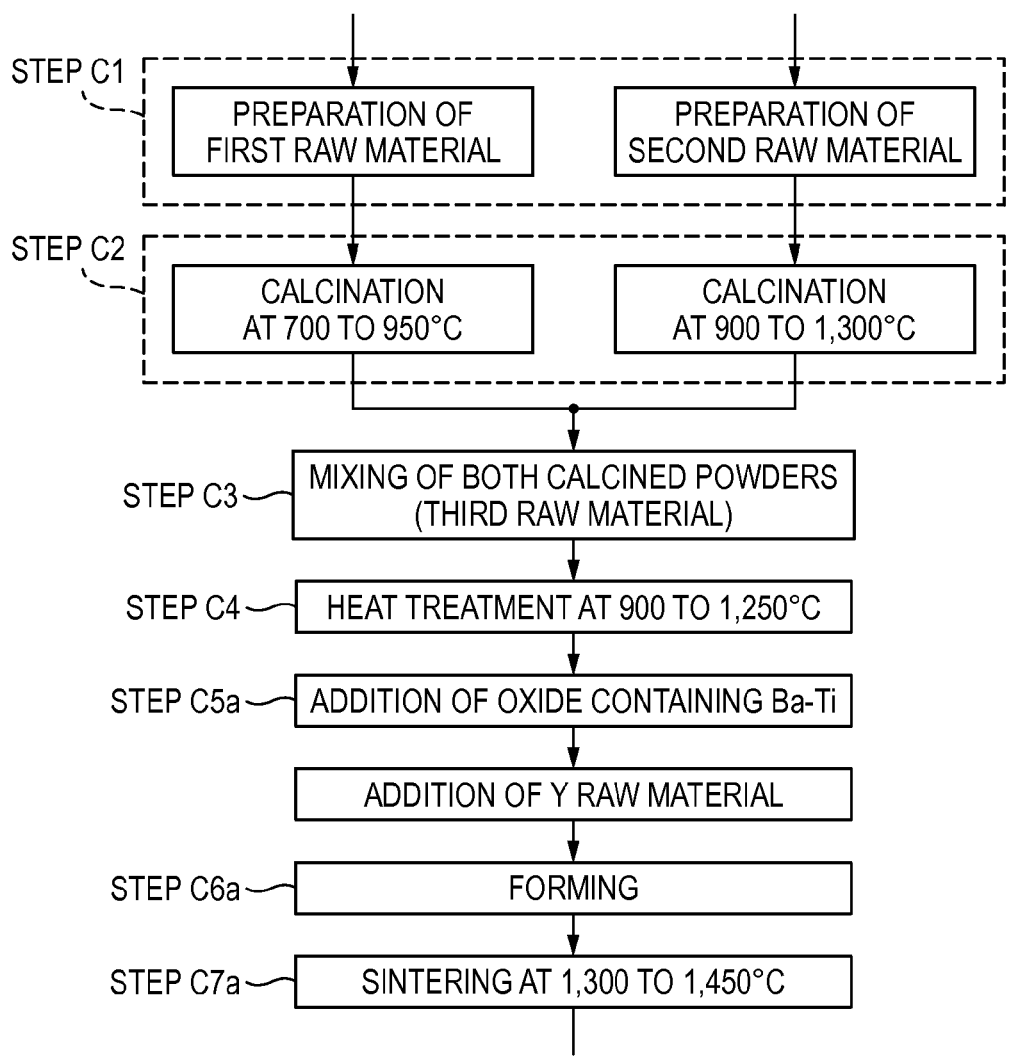
FIG. 26 is a view for explaining the production method of the semiconductor ceramic composition of the present invention.

As shown in FIG. 26, a (BiA)TiO$_3$-based first raw material and a (BaR)[TiM]O$_3$-based second raw material were prepared as the raw material (Step C1). In this Example, raw material powders of Na$_2$CO$_3$, Bi$_2$O$_3$ and TiO$_2$ were prepared as the (BiA)TiO$_3$-based first raw material, combined to provide (Bi$_{0.5}$Na$_{0.5}$)TiO$_3$ where the molar ratio Bi/Na of Bi and Na is 1.0, and dry mixed. Also, raw material powders of BaCO$_3$, TiO$_2$ and La$_2$O$_3$ were prepared as the (BaR)[TiM]O$_3$-based second raw material, combined to provide (Ba$_{0.994}$La$_{0.006}$)TiO$_3$, and mixed using pure water.

The first raw material was calcined at 700° C. to 950° C., and the second raw material was calcined at 900° C. to 1,300° C. (Step C2). In this Example, the calcination was performed under the following conditions. The obtained first raw material was calcined at 800° C. for 2 hours in the atmosphere to prepare a (BiA)TiO$_3$-based calcined powder. Also, the second raw material was calcined at 1,100° C. for 4 hours in the atmosphere to prepare a (BaR)[TiM]O$_3$-based calcined powder.

Respective calcined raw materials were mixed to prepare a third raw material (Step C3). In this Example, the mixing was performed under the following conditions. The (BiA)TiO$_3$-based calcined powder and the (BaR)[TiM]O$_3$-based calcined powder were mixed to provide [(Bi$_{0.5}$Na$_{0.5}$)$_{0.085}$(Ba$_{0.994}$La$_{0.006}$)$_{0.915}$]TiO$_3$. This raw material was mixed and pulverized in a pot mill by using pure water as the medium until the average particle diameter became from 0.8 μm to 3.0 μm, and then dried to prepare a third raw material.

The third raw material was heat-treated at 900° C. to 1,250° C. (Step C4). In this Example, the heat treatment was performed under the following conditions. The third raw material was heat-treated at 1,150° C. for 4 hours in the atmosphere so as to react the (BiA)TiO$_3$-based calcined powder and the (BaR)[TiM]O$_3$-based calcined powder. The heat treatment temperature was set to a temperature at which respective diffraction lines of the (BiA)TiO$_3$-based calcined powder and the (BaR)[TiM]O$_3$-based calcined powder become one line in the X-ray diffraction.

Subsequently, an oxide containing Ba and Ti oxide, which becomes a liquid phase at 1,300° C. to 1,450° C., was added to the heat-treated third raw material (Step C5a). In this Example, the addition was performed under the following conditions. Materials where Ba$_6$Ti$_{17}$O$_{40}$ was added in an amount of 0.29 mol %, 0.37 mol %, 0.44 mol %, 0.51 mol % or 0.59 mol % based on the entire raw material of the semiconductor ceramic composition were prepared.

Also, $Y_2O_3$ was added in an amount of 0.4 mol % based on the entire raw material of the semiconductor ceramic composition.

Thereafter, the mixture was formed (Step C6a). In this Example, PVA was added and mixed in the mixture of the third raw material, BaTi oxide and $Y_2O_3$, and the resulting material was granulated. The granulated powder obtained was formed into a plate of 15 mm×15 mm×3.4 mm by forming on a monoaxial pressing apparatus and subjected to binder removal at 700° C.

Furthermore, the formed powder was sintered in the temperature region of 1,300° C. to 1,450° C. (Step C7a). In this Example, the sintering was performed under the following conditions. The formed powder was sintered by holding it at 1,320 to 1,420° C. for 4 hours in nitrogen under the condition of an oxygen concentration of 70 ppm to obtain a sintered body.

The sintered body obtained was processed into a plate of 10 mm×10 mm×1.0 mm to produce a test piece, an ohmic electrode was coated thereon, a cover electrode was further coated, and drying at 180° C. and then baking at 600° C. for a holding time of 10 minutes were performed to form electrodes.

FIG. 14 shows the relationship between the sintering temperature and the temperature coefficient $\alpha$ of resistance.

As the amount of the BaTi oxide added was increased, a semiconductor ceramic composition exhibiting a large temperature coefficient $\alpha$ of resistance even when sintered at a low temperature was obtained.

Vaporization of Bi during sintering can be suppressed by carrying out the sintering at a low temperature as compared with the conventional production method where a BaTi oxide is not added after calcination, as a result, it becomes easy to control the compositional formulation of the semiconductor ceramic composition after sintering.

Also, when the same test was performed for a composition formula where Na is substituted by Li or K, evaluation results having the same tendency as in FIG. 14 were obtained. In addition, even when BaTi$_2$O$_5$, Ba$_4$Ti$_{13}$O$_{30}$, BaTi$_3$O$_7$, BaTi$_4$O$_9$, Ba$_2$Ti$_9$O$_{20}$ or Ba$_2$TiO$_5$ was used as the BaTi oxide, evaluation results having the same tendency were obtained.

The semiconductor ceramic composition obtained in this Example has a crystal grain in the inside thereof. The crystal grain has a region between a center portion and an outer shell portion within the crystal grain, in which when Bi concentration is measured in a radial direction within the crystal grain, the Bi concentration in the region is higher than both Bi concentration in the center portion and Bi concentration in the outer shell portion. The maximum value of the Bi concentration is 0.4 mol % or more. The middle portion has a concentration of 3 times or more greater than the Bi concentration in the center portion. Also, the outer shell portion has a concentration of 1.5 times or more greater than the Bi concentration in the center portion.

The compositional formulation of the crystal grain was examined, as a result, the composition formula was represented by $[(BiA)_x(Ba_{1-y}R_y)_{1-x}][Ti_{1-z}M_z]O_3$ (wherein A is at least one kind of Na, Li and K, R is at least one kind of rare earth elements including Y, and M is at least one kind of Nb, Ta and Sb) in which x, y and z satisfied $0<x\le0.2$, $0\le y\le0.02$ and $0\le z\le0.01$ (provided that $y+z>0$).

Also, a secondary phase containing Y and a secondary phase not containing Y were present in addition to the crystal grain, and in the secondary phase containing Y, Y amount in a portion distant from the crystal grain was larger than Y amount in a portion adjacent to the crystal grain.

Furthermore, the crystal grain had a higher Y concentration in the outer shell portion than in the center portion within the crystal grain.

Example D1

The effect of the oxygen concentration in the atmosphere during sintering on the room-temperature resistivity $R_{25}$ was examined.

A $(BiA)TiO_3$-based first raw material and a $(BaR)[TiM]O_3$-based second raw material were prepared as the raw material. In this Example, raw material powders of $Na_2CO_3$, $Bi_2O_3$ and $TiO_2$ were prepared as the $(BiA)TiO_3$-based first raw material, combined to provide $(Bi_{0.5}Na_{0.5})TiO_3$ where the molar ratio Bi/Na of Bi and Na is 1.0, and dry mixed. Also, raw material powders of $BaCO_3$, $TiO_2$ and $La_2O_3$ were prepared as the $(BaR)[TiM]O_3$-based second raw material, combined to provide $(Ba_{0.994}La_{0.006})TiO_3$, and mixed using pure water.

The first raw material was calcined at 700° C. to 950° C., and the second raw material was calcined at 900° C. to 1,300° C. In this Example, the calcination was performed under the following conditions. The obtained first raw material was calcined at 800° C. for 2 hours in the atmosphere to prepare a $(BiA)TiO_3$-based calcined powder. Also, the second raw material was calcined at 1,200° C. for 4 hours in the atmosphere to prepare a $(BaR)[TiM]O_3$-based calcined powder.

Respective calcined materials were mixed to prepare a third raw material. In this Example, the mixing was performed under the following conditions. The $(BiA)TiO_3$-based calcined powder and the $(BaR)[TiM]O_3$-based calcined powder were mixed to provide $[(Bi_{0.5}Na_{0.5})_{0.085}(Ba_{0.994}La_{0.006})_{0.915}]TiO_3$. This material was mixed and pulverized in a pot mill by using pure water as the medium until the average particle diameter became from 2.0 µm to 3.0 µm, and then dried to prepare a third raw material.

The third raw material was heat-treated at 900° C. to 1,250° C. In this Example, the heat treatment was performed under the following conditions. The third raw material was heat-treated at 1,150° C. for 4 hours in the atmosphere so as to react the $(BiA)TiO_3$-based calcined powder and the $(BaR)[TiM]O_3$-based calcined powder. The heat treatment temperature was set to a temperature at which respective diffraction lines of the $(BiA)TiO_3$-based calcined powder and the $(BaR)[TiM]O_3$-based calcined powder become one line in the X-ray diffraction.

Subsequently, $Ba_6Ti_{17}O_{40}$ and $Y_2O_3$ were added in amount of 0.72 mol % and 1.47 mol %, respectively, based on the entire raw material of the semiconductor ceramic composition.

Thereafter, the mixture was formed. In this Example, the forming was performed under the following conditions. PVA was added and mixed, and the resulting material was granulated. The granulated powder obtained was formed into a plate of 15 mm×15 mm×3.4 mm by a monoaxial pressing apparatus and subjected to binder removal at 700° C.

Furthermore, the formed powder was sintered. In this Example, the sintering was performed under the following conditions. The formed powder was sintered by holding it at 1,420° C. for 4 hours in nitrogen and varying the oxygen concentration to 70 ppm, 150 ppm, 200 ppm, 890 ppm, 4,000 ppm and 7,000 ppm.

The sintered body obtained was processed into a plate of 10 mm×10 mm×1.0 mm to produce a test piece, an ohmic electrode was coated thereon, a cover electrode was further coated, and drying at 180° C. and then baking at 600° C. for a holding time of 10 minutes were performed to form electrodes, whereby the sample obtained by the production method of Example D1 was measured for the room-temperature resistivity $R_{25}$.

Figure 27:
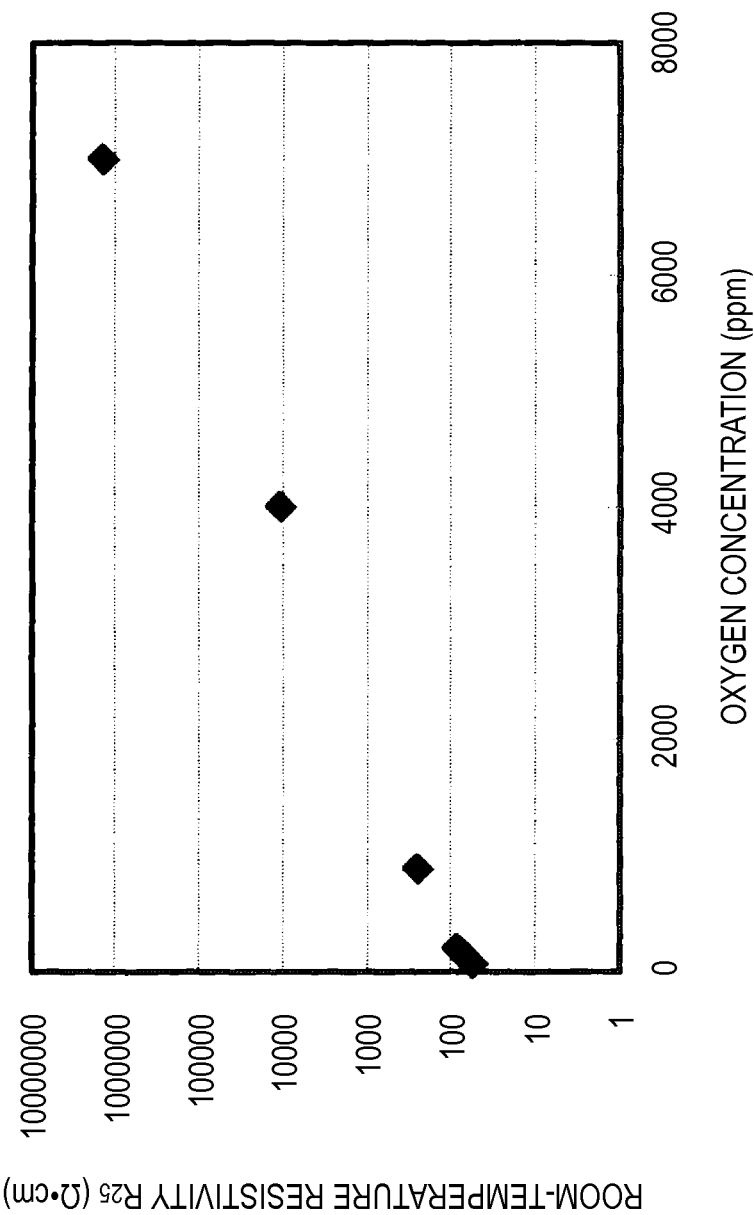
FIG. 27 is a view showing the relationship between the oxygen concentration during sintering and the room-temperature resistivity $R_{25}$.

FIG. 27 shows the relationship between the oxygen concentration and the room-temperature resistivity $R_{25}$ of the composition obtained in Example D1. As shown in FIG. 27, the room-temperature resistivity $R_{25}$ can be adjusted to several tens to several ten thousands of Ωcm by increasing the oxygen concentration during sintering. Also, all semiconductor ceramic compositions obtained by the production method of Example D1 have a Curie temperature $T_C$ of 150° C. or more. The temperature coefficient α of resistance of the semiconductor ceramic composition sintered by setting the oxygen concentration to 4,000 ppm was 3.75%/° C. In all of the semiconductor ceramic compositions sintered with a lower oxygen concentration than that, the temperature coefficient α of resistance was 4.50%/° C. or more.

However, in the case of the semiconductor ceramic composition sintered with an oxygen concentration of 7,000 ppm, the temperature coefficient α of resistance was 0.39%/° C. It is presumed that as long as a practical semiconductor ceramic composition is intended to obtain, a composition having a sufficiently large temperature coefficient α of resistance is obtained with an oxygen concentration of 5,000 ppm or less.

In all semiconductor ceramic compositions obtained in this Example, the change over time was 50% or less, the heat-resistant temperature was 350° C. or less, the withstand voltage was 350 V or less, and the normalized withstand voltage was 3.0 or more.

The semiconductor ceramic composition obtained in this Example has a crystal grain in the inside thereof. The crystal grain has a region between a center portion and an outer shell portion within the crystal grain, in which when Bi concentration is measured in a radial direction within the crystal grain, the Bi concentration in the region is higher than both Bi concentration in the center portion and Bi concentration in the outer shell portion. The maximum value of the Bi concentration is 0.4 mol % or more.

The compositional formulation of the crystal grain was examined, as a result, the composition formula was represented by $[(BiA)_x(Ba_{1-y}R_y)_{1-x}][Ti_{1-z}M_z]O_3$ (wherein A is at least one kind of Na, Li and K, R is at least one kind of rare earth elements including Y, and M is at least one kind of Nb, Ta and Sb) in which x, y and z satisfied $0<x\le0.2$, $0\le y\le0.02$ and $0\le z\le0.01$ (provided that $y+z>0$).

Also, a secondary phase containing Y and a secondary phase not containing Y were present in addition to the crystal grain, and in the secondary phase containing Y, Y amount in a portion distant from the crystal grain was larger than Y amount in a portion adjacent to the crystal grain.

Furthermore, the crystal grain had a higher Y concentration in the outer shell portion than in the center portion within the crystal grain.

Example D2

The compositional formulation of the semiconductor ceramic composition of the present invention was prepared as a compositional formulation where La is substituted by another rare earth, and its effect on characteristics was examined. In Example D2, Y was not added after heat treatment.

A (BiA)TiO$_3$-based first raw material and a (BaR)[TiM]O$_3$-based second raw material were prepared as the raw material. In this Example, raw material powders of Na$_2$CO$_3$, Bi$_2$O$_3$ and TiO$_2$ were prepared as the (BiA)TiO$_3$-based first raw material, combined to provide (Bi$_{0.5}$Na$_{0.5}$)TiO$_3$ where the molar ratio Bi/Na of Bi and Na is 1.0, and dry mixed. Also, raw material powders of BaCO$_3$ and TiO$_2$ as well as Ho$_2$O$_3$, Y$_2$O$_3$, Er$_2$O$_3$, Tm$_2$O$_3$, Yb$_2$O$_3$, Lu$_2$O$_3$ and Sc$_2$O$_3$ which are rare earth raw materials, were prepared as the (BaR)[TiM]O$_3$-based second raw material, combined to provide (Ba$_{0.994}$R$_{0.006}$)TiO$_3$, and mixed using pure water.

The first raw material was calcined at 700° C. to 950° C., and the second raw material was calcined at 900° C. to 1,300° C. In this Example, the calcination was performed under the following conditions. The obtained first raw material was calcined at 800° C. for 2 hours in the atmosphere to prepare a (BiA)TiO$_3$-based calcined powder. Also, the second raw material was calcined at 1,200° C. for 4 hours in the atmosphere to prepare a (BaR)[TiM]O$_3$-based calcined powder.

Respective calcined materials were mixed to prepare a third raw material. In this Example, the mixing was performed under the following conditions. The (BiA)TiO$_3$-based calcined powder and the (BaR)[TiM]O$_3$-based calcined powder were mixed to provide [(Bi$_{0.5}$Na$_{0.5}$)$_{0.085}$(Ba$_{0.994}$R$_{0.006}$)$_{0.915}$]TiO$_3$. This material was mixed and pulverized in a pot mill by using pure water as the medium until the average particle diameter became from 2.0 μm to 3.0 μm, and then dried to prepare a third raw material.

The third raw material was heat-treated at 900° C. to 1,250° C. In this Example, the heat treatment was performed under the following conditions. The third raw material was heat-treated at 1,150° C. for 4 hours in the atmosphere so as to react the (BiA)TiO$_3$-based calcined powder and the (BaR)[TiM]O$_3$-based calcined powder. The heat treatment temperature was set to a temperature at which respective diffraction lines of the (BiA)TiO$_3$-based calcined powder and the (BaR)[TiM]O$_3$-based calcined powder become one line in the X-ray diffraction.

Subsequently, Ba$_6$Ti$_{17}$O$_{40}$ was added in amount of 0.72 mol % based on the entire raw material of the semiconductor ceramic composition.

Thereafter, the mixture was formed. In this Example, the forming was performed under the following conditions. PVA was added and mixed, and the resulting material was granulated. The granulated powder obtained was formed into a plate of 15 mm×15 mm×3.4 mm by a monoaxial pressing apparatus and subjected to binder removal at 700° C.

Furthermore, the formed powder was sintered. In this Example, the sintering was performed under the following conditions. The formed powder was sintered by holding it at 1,420° C. for 4 hours in nitrogen under the condition of an oxygen concentration of 70 ppm.

The sintered body obtained was processed into a plate of 10 mm×10 mm×1.0 mm to produce a test piece, an ohmic electrode was coated thereon, a cover electrode was further coated, and drying at 180° C. and then baking at 600° C. for a holding time of 10 minutes were performed to form electrodes.

The measured results of temperature coefficient α of resistance and room-temperature resistivity R$_{25}$ are shown in Tables 13 and 14. With any R employed, a semiconductor ceramic composition having a large temperature coefficient α of resistance was obtained. Although this may depend on the sintering temperature, when Y or Er is used, a semiconductor ceramic composition having a room-temperature resistivity R$_{25}$ of 100 Ωcm or less is likely to be obtained, and when Tm, Yb, Lu or Sc is used, a semiconductor ceramic composition having a room-temperature resistivity R$_{25}$ of more than 100 Ωcm is likely to be obtained. In the semiconductor ceramic composition using Yb, the room-temperature resistivity R$_{25}$ was 3,000 Ωcm or more. Also, in the case of Ho, when the sintering temperature is 1,400° C. or more, a semiconductor ceramic composition having a room-temperature resistivity R$_{25}$ of 100 Ωcm or less is obtained.

TABLE 13

| | Sintering Temperature (° C.) | | | |
|---|---|---|---|---|
| R | 1320 | 1340 | 1380 | 1420 |
| Ho | — | — | 300.6 | 40.9 |
| Y | — | — | 51.2 | 42.5 |
| Er | 120.5 | 58.4 | 58.4 | 51.6 |
| Tm | 434.3 | 532.5 | 176.8 | 85.7 |
| Yb | 13049.5 | 14428.4 | 5518.6 | 3049.9 |
| Lu | 109.9 | 216.6 | 584.7 | 272.8 |
| Sc | — | 130.4 | 253.9 | — |

Room-temperature resistivity (unit: Ω · cm)

TABLE 14

| | Sintering Temperature (° C.) | | | |
|---|---|---|---|---|
| R | 1320 | 1340 | 1380 | 1420 |
| Ho | — | — | 9.2 | 4.9 |
| Y | — | — | 5.9 | 4.5 |
| Er | 8.3 | 6.5 | 5.9 | 6.0 |
| Tm | 9.0 | 8.7 | 8.1 | 6.7 |
| Yb | 7.4 | 6.5 | 6.9 | 4.8 |
| Lu | 8.5 | 7.4 | 8.7 | 7.6 |
| Sc | — | 7.3 | 5.9 | — |

Temperature coefficient α of resistance (unit: %/° C.)

In all semiconductor ceramic compositions obtained in this Example, the heat-resistant temperature was 350° C. or less, the withstand voltage was 350 V or less, and the normalized withstand voltage was 3.0 or more.

The semiconductor ceramic composition obtained in this Example has a crystal grain in the inside thereof. The crystal grain has a region between a center portion and an outer shell portion within the crystal grain, in which when Bi concentration is measured in a radial direction within the crystal grain, the Bi concentration in the region is higher than both Bi concentration in the center portion and Bi concentration in the outer shell portion. The maximum value of the Bi concentration is 0.4 mol % or more.

The compositional formulation of the crystal grain was examined, as a result, the composition formula was represented by [(BiA)$_x$(Ba$_{1-y}$R$_y$)$_{1-x}$][Ti$_{1-z}$M$_z$]O$_3$ (wherein A is at least one kind of Na, Li and K. R is at least one kind of rare earth elements including Y, and M is at least one kind of Nb, Ta and Sb) in which x, y and z satisfied 0<x≤0.2, 0≤y≤0.02 and 0≤z≤0.01 (provided that y+z>0).

Also, a secondary phase containing Y and a secondary phase not containing Y were present in addition to the crystal grain, and in the secondary phase containing Y, Y amount in a portion distant from the crystal grain was larger than Y amount in a portion adjacent to the crystal grain.

Furthermore, the crystal grain had a higher Y concentration in the outer shell portion than in the center portion within the crystal grain.

While the invention has been described in detail and with reference to specific embodiments thereof, it will be apparent to one skilled in the art that various changes and modifications can be made therein without departing from the spirit and scope of the invention.

This application is based on Japanese Patent Application (Patent Application No. 2012-96546) filed on Apr. 20, 2012, Japanese Patent Application (Patent Application No. 2012-118120) filed on May 24, 2012, and Japanese Patent Application (Patent Application No. 2012-279711) filed on Dec. 21, 2012, the contents of which are incorporated herein by way of reference.

INDUSTRIAL APPLICABILITY

The semiconductor ceramic composition according to the invention is optimal as a material for a PTC heater, a PTC thermistor, a PTC switch, a temperature detector, and the like.

DESCRIPTION OF REFERENCE NUMERALS AND SIGNS

1: outer shell portion, 2: middle portion (portion having highest Bi concentration), 3: center portion, 5: PTC body, 6: electrode, 100: PTC element, 10: crystal grain, 20: portion distant from crystal grain in secondary phase containing Y, 30: portion adjacent to crystal grain in secondary phase containing Y, and 40: another secondary phase not containing Y.

The invention claimed is:

1. A semiconductor ceramic composition that is a lead-free semiconductor ceramic composition in which a portion of Ba in a $BaTiO_3$-based oxide is substituted by Bi and A (wherein A is at least one kind of Na, Li and K), the semiconductor ceramic composition having a region between a center portion and an outer shell portion within a crystal grain, wherein when Bi concentration is measured in a radial direction within the crystal grain, the Bi concentration in the region is higher than both Bi concentration in the center portion and Bi concentration in the outer shell portion.

2. The semiconductor ceramic composition according to claim 1, a maximum value of the Bi concentration is 0.4 mol % or more within the crystal grain.

3. The semiconductor ceramic composition according to claim 1, wherein a value (normalized withstand voltage $V_L$) obtained by dividing a withstand voltage $V_0$ (V) per 1 mm thickness by a room-temperature resistivity $R_{25}$ (Ωcm) is 3.0 or more.

4. The semiconductor ceramic composition according to claim 1, having a crystal grain which is represented by a composition formula of $[(BiA)_x(Ba_{1-y}R_y)_{1-x}][Ti_{1-z}M_z]O_3$ (wherein A is at least one kind of Na, Li and K, R is at least one kind of rare earth elements including Y, and M is at least one kind of Nb, Ta and Sb) in which x, y and z satisfy $0<x\leq0.2$, $0\leq y\leq0.02$ and $0\leq z\leq0.01$ (provided that y+z>0).

5. The semiconductor ceramic composition according to claim 1, having a structure comprising:
a crystal grain which is represented by a composition formula of $[(BiA)_x(Ba_{1-y}R_y)_{1-x}][Ti_{1-z}M_z]O_3$ (wherein A is at least one kind of Na, Li and K, R is at least one kind of rare earth elements including Y, and M is at least one kind of Nb, Ta and Sb) in which x, y and z satisfy $0<x\leq0.2$, $0\leq y\leq0.02$ and $0\leq z\leq0.01$ (provided that y+z>0);

a secondary phase containing Y; and a secondary phase not containing Y, wherein in the secondary phase containing Y, Y amount in a portion distant from the crystal grain is larger than Y amount in a portion adjacent to the crystal grain.

6. The semiconductor ceramic composition according to claim 5, wherein Y concentration in the outer shell portion is higher than Y concentration in the center portion within the crystal grain.

7. A PTC element comprising:

the semiconductor ceramic composition according to claim 1; and an electrode provided on the semiconductor ceramic composition.

8. A method for producing a semiconductor ceramic composition that is a lead-free semiconductor ceramic composition in which a portion of Ba in a $BaTiO_3$-based oxide is substituted by Bi and A (wherein A is at least one kind of Na, Li and K), the method comprising:

preparing, as a raw material, a $(BiA)TiO_3$-based first raw material and a $(BaR)[TiM]O_3$ (wherein R is at least one kind of rare earth elements including Y, M is at least one kind of Nb, Ta and Sb, and at least either one of R and M is an essential element)-based second raw material;

calcining the first raw material at 700° C. to 950° C. and the second raw material at 900° C. to 1,300° C.;

preparing a third raw material by mixing respective calcined raw materials;

heat-treating the third raw material at 900° C. to 1,250° C.; and forming and sintering the third raw material so as to form a crystal grain having a region between a center portion and an outer shell portion within the crystal grain, wherein when Bi concentration is measured in a radial direction within the crystal grain, the Bi concentration in the region is higher than both Bi concentration in the center portion and Bi concentration in the outer shell portion.

9. The method for producing a semiconductor ceramic composition according to claim 8, wherein Y raw material is added after heat-treating the third raw material, followed by forming and sintering.

10. The method for producing a semiconductor ceramic composition according to claim 9, wherein the Y raw material is added, in terms of $Y_2O_3$, in a range of 0.5 mol % to 4.0 mol % based on the entire raw material (including the Y raw material) of the semiconductor ceramic composition.

11. The method for producing a semiconductor ceramic composition according to claim 10, wherein the second raw material is calcined at 1,100° C. to 1,300° C.

12. The method for producing a semiconductor ceramic composition according to claim 8, wherein an oxide containing Ba and Ti is added after heat-treating the third raw material, followed by forming and sintering.

13. The method for producing a semiconductor ceramic composition according to claim 12, wherein the third raw material is sintered at a temperature of 1,300° C. to 1,450° C.

14. The method for producing a semiconductor ceramic composition according to claim 11, wherein the oxide containing Ba and Ti is added, in terms of $Ba_6Ti_{17}O_{40}$, in a range of 0.1 mol % to 1.0 mol % based on the entire raw material (including the oxide containing Ba and Ti) of the semiconductor ceramic composition.

15. The method for producing a semiconductor ceramic composition according to claim 8, wherein the first and second raw materials are mixed such that the semiconductor ceramic composition is represented by a composition formula of $[(BiA)x(Ba_{1-y}R_y)1-x][Ti_{1-z}M_z]O_3$ (wherein A is at least one kind of Na, Li and K, R is at least one kind of rare earth elements including Y, and M is at least one kind of Nb, Ta and Sb) in which x, y and z satisfy $0<x\leq0.2$, $0\leq y\leq0.05$ and $0\leq z\leq0.01$ (provided that y+z>0).

* * * * *